United States Patent
Etchells et al.

(10) Patent No.: US 7,585,530 B2
(45) Date of Patent: *Sep. 8, 2009

(54) FOOD PRESERVATION SYSTEMS

(75) Inventors: Marc D Etchells, Florence, MA (US); Sayandro Versteylen, Rancho Cucamonga, CA (US)

(73) Assignee: Paper-Pak Industries, LaVerne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/552,952

(22) Filed: Oct. 25, 2006

(65) Prior Publication Data

US 2007/0048415 A1    Mar. 1, 2007

Related U.S. Application Data

(63) Continuation of application No. 11/335,373, filed on Jan. 19, 2006.

(60) Provisional application No. 60/645,856, filed on Jan. 21, 2005.

(51) Int. Cl.
*A23L 1/28* (2006.01)

(52) U.S. Cl. .................. 426/426; 426/124; 426/316; 426/398; 426/418; 426/129; 426/324; 426/133; 426/392; 426/393; 426/410; 426/106; 206/524.4; 206/204; 206/205

(58) Field of Classification Search .................. 426/124, 426/316, 398, 324, 106, 426, 133, 392, 393, 426/410, 402, 404, 418, 129; 206/524.4, 206/204, 205; 422/28
See application file for complete search history.

(56) References Cited

U.S. PATENT DOCUMENTS

| | | | |
|---|---|---|---|
| 3,026,209 A | 3/1962 | Niblack | |
| 4,275,811 A | 6/1981 | Miller | |
| 4,410,578 A | 10/1983 | Miller | |
| 4,576,278 A | 3/1986 | Laiewski | |
| 4,861,632 A * | 8/1989 | Caggiano | 428/35.2 |
| 4,865,855 A | 9/1989 | Hansen et al. | |
| 4,943,440 A * | 7/1990 | Armstrong | 426/118 |
| 5,176,930 A | 1/1993 | Kannankeril | |

(Continued)

FOREIGN PATENT DOCUMENTS

WO    WO 0032052 A1    6/2000

OTHER PUBLICATIONS

Infoplease Dictionary. Entry for "pad". http://www.infoplease.com.*

(Continued)

*Primary Examiner*—Anthony Weier
(74) *Attorney, Agent, or Firm*—Ohlandt, Greeley, Ruggiero & Perle, L.L.P.

(57) ABSTRACT

The present invention provides a food preservation system that includes a multi-phase bacterial inhibition food pad. The food pad includes absorbent media and/or material to absorb fluids emanating from the packaged food. The absorbent media/material includes one or more bacterial inhibitors that may possess bacteriostatic and/or bactericidal properties. In addition, the food pad may also include an atmosphere modification system capable of modifying an atmosphere in a food package. Optionally, one or more reaction promoters and/or one or more mechanisms to protect the food preservation system may also be included in the food pad. Overall, the food preservation system inhibits bacterial growth, thereby enhancing food preservation and/or food safety.

4 Claims, 18 Drawing Sheets

U.S. PATENT DOCUMENTS

| | | | |
|---|---|---|---|
| 5,186,902 A * | 2/1993 | Plester | 422/112 |
| 5,505,950 A * | 4/1996 | Floyd et al. | 426/404 |
| 5,527,570 A * | 6/1996 | Addeo et al. | 428/35.7 |
| 5,650,446 A * | 7/1997 | Wellinghoff et al. | 514/772.3 |
| 5,705,213 A * | 1/1998 | Guillin | 426/129 |
| 5,709,897 A | 1/1998 | Pearlstein | |
| 5,721,187 A * | 2/1998 | Ogawa et al. | 502/417 |
| 5,845,769 A | 12/1998 | Yeager | |
| 5,908,649 A * | 6/1999 | Floyd et al. | 426/109 |
| 5,922,776 A * | 7/1999 | Wellinghoff et al. | 514/772.3 |
| 6,223,894 B1 | 5/2001 | Lemaire | |
| 6,298,983 B1 | 10/2001 | Yeager | |
| 6,592,919 B1 | 7/2003 | Matthews | |
| 6,596,191 B2 * | 7/2003 | Sakamoto et al. | 252/188.28 |
| 6,695,138 B1 | 2/2004 | Colombo | |
| 6,862,980 B2 * | 3/2005 | Heil et al. | 99/467 |
| 6,983,575 B2 * | 1/2006 | Longo | 53/432 |
| 7,025,198 B2 * | 4/2006 | Bekele et al. | 206/204 |
| 7,189,666 B2 * | 3/2007 | Finnegan et al. | 442/153 |
| 7,241,481 B2 * | 7/2007 | Speer et al. | 428/35.2 |
| 2001/0031298 A1 | 10/2001 | Fuller | |
| 2003/0054072 A1 * | 3/2003 | Merriman et al. | 426/124 |
| 2003/0054073 A1 * | 3/2003 | DelDuca et al. | 426/124 |
| 2003/0057114 A1 | 3/2003 | Brander | |
| 2003/0203080 A1 * | 10/2003 | Garavaglia et al. | 426/127 |
| 2003/0207000 A1 * | 11/2003 | Merriman et al. | 426/124 |
| 2003/0215551 A1 * | 11/2003 | Garwood | 426/392 |
| 2004/0047952 A1 * | 3/2004 | Merriman et al. | 426/124 |
| 2004/0071840 A1 * | 4/2004 | Tewari | 426/133 |
| 2004/0081731 A1 * | 4/2004 | Hood | 426/393 |
| 2004/0137202 A1 * | 7/2004 | Hamilton et al. | 428/174 |
| 2004/0195115 A1 | 10/2004 | Colombo | |
| 2005/0008737 A1 * | 1/2005 | Kwon | 426/124 |
| 2005/0037114 A1 * | 2/2005 | Weems et al. | 426/115 |
| 2005/0208188 A1 | 9/2005 | Garwood | |
| 2007/0066170 A1 * | 3/2007 | Finnegan et al. | 442/153 |
| 2008/0199577 A1 * | 8/2008 | Jensen et al. | 426/393 |

OTHER PUBLICATIONS

Merriam-Webster Dictionary. Entry for "package". http://www.m-w.com.*

Infoplease Dictionary. Entry for "Ipad". http://www.infoplease.com. No date provided.*

Merriam-Webster Dictionary. Entry for "package". http://www.m-w.com. No date provided.*

* cited by examiner

FOOD PRESERVATION SYSTEMS

RELATED APPLICATION

This application is a Continuation application of U.S. application Ser. No. 11/335,373, filed on Jan. 19, 2006, hereby incorporated by reference, which claims the benefit of U.S. Provisional Patent Application Ser. No. 60/645,856, filed on Jan. 21, 2005.

BACKGROUND OF THE INVENTION

1. Field of Invention

The present invention relates generally to food preservation systems. More particularly, the present invention relates to a food preservation system and includes a multi-phase bacterial inhibition food pad.

2. Description of Related Art

Approaches to food preservation are generally designed to enhance the shelf life of packaged products. Before packaging, most foods contain appreciable levels of moisture and fluids that contain bacteria. These fluids and moisture provide nutrients to create a hospitable environment for further bacterial proliferation, which ultimately results in spoilage indicators such as food discoloration, slime, and/or unpleasant odors.

The type and concentration of bacteria within food packaging may vary, and is often a function of many factors such as processing conditions, type of food, and the initial bacterial load present at packaging. High levels of bacteria reduce the shelf life, affect quality of packaged foods, and may present serious health risks to consumers.

Approaches to increasing shelf life have been largely unsuccessful because they have not completely addressed the many variables required for an effective food preservation system. These factors include, but are not limited to, microbial contamination of food products during processing, external contamination, water contained within the food or "water activity" fluids released from the food and contained within the packaging system, pH, temperature or pressure considerations, and internal gas concentration. Variations in these conditions significantly contribute to decrease food safety and bacterial proliferation.

One approach to controlling bacterial growth has been to deliver components into the food preservation system including individual gases such as $O_2$ and $CO_2$. An example is the Modified Atmospheric Packaging (MAP) technique in which, specific levels of oxygen, carbon dioxide, nitrogen, argon and other gases are introduced into the food packaging system. However, without an absorbent pad and an efficient method of balancing and modifying these components, this approach still leaves a need for a versatile system of food preservation because of the difficulty associated with maintaining the created atmosphere. Of particular concern when using elevated levels of CO2, is the observation that CO2 levels gradually diminishes over time as fluids in the food and the food products itself both absorb the gas until the point of saturation. Additionally, package films transmit oxygen, carbon dioxide and other gasses through the film and at times the seal may fail, which leads to gas leakage, and results in a failure to maintain the desired gas concentrations of the original internal modified atmosphere.

These attempts in the prior art to reduce the bacterial population, within food packaging have failed to provide a comprehensive solution. Therefore, there remains a strong need in the art for a versatile system of preservation that effectively reduces bacterial load while maintaining the quality of the food product. The present invention meets this need.

SUMMARY OF THE INVENTION

It is an object of the present invention to provide a versatile food preservation system with a multi-phase bacterial inhibition food pad.

It is still another object of the present invention to provide such a food preservation system with a multi-phase bacterial inhibition pad having one or more bacterial inhibitors.

It is yet another object of the present invention to provide such a food preservation system that includes one or more chemical components within the multi-phase food preservation pad to modify the atmosphere of the food preservation system.

It is a further object of the present invention to provide such a food preservation system with an atmosphere modification system disposed in the multi-phase bacterial inhibition pad to modify the $O_2/CO_2$ gas ratio within a food package.

It is yet a further object of the present invention to provide such a food preservation system with one or more reaction promoters to modify the $O_2/CO_2$ gas ratio within the food package.

It is still a further object of the present invention to provide one or more mechanisms to protect the chemical systems within the multi-phase food preservation pad from excess moisture.

It is another object of the present invention to provide an integrated food packaging system generally utilizing components such as a tray, absorbent media, and film overwrap or tray lid.

It is another object on the present invention to provide such an integrated food packaging system that includes a synergistic combination of a multi-phase food preservation pad with one or more food packaging components.

It is another object of this invention to provide a pad with larger physical size and capacity to be used when food is packaged, stored or transported in bulk.

These and other objects and advantages of the present invention are provided by a food preservation system that includes a multi-phase bacterial inhibition food pad. The food pad includes absorbent media and/or material to absorb fluids emanating from the packaged food. The absorbent media/material is treated with one or more bacterial inhibitors. In addition, the food pad may also include an atmosphere modification system capable of modifying an atmosphere in a food package. Optionally, one or more reaction promoters and/or one or more mechanisms to protect the food preservation system may also be included in the food pad. Overall, the food preservation system inhibits bacterial growth, thereby enhancing food preservation and/or food safety.

DETAILED DESCRIPTION OF THE INVENTION

The present invention provides a multi-phase bacterial inhibition food pad with an absorbent or superabsorbent medium and one or more bacterial inhibitors, an atmosphere modification system, or any combination thereof, and optionally one or more reaction promoters and/or means for absorbing excess moisture and/or means to prevent premature reactions. As a result, existing bacteria is killed and bacterial growth is inhibited in packaged food resulting in enhanced food preservation, shelf life, and food safety.

The term "bacterial inhibitor" and "inhibiting", as used throughout the application, is meant to include having both bactericidal and/or bacteriostatic properties.

Figure 1:
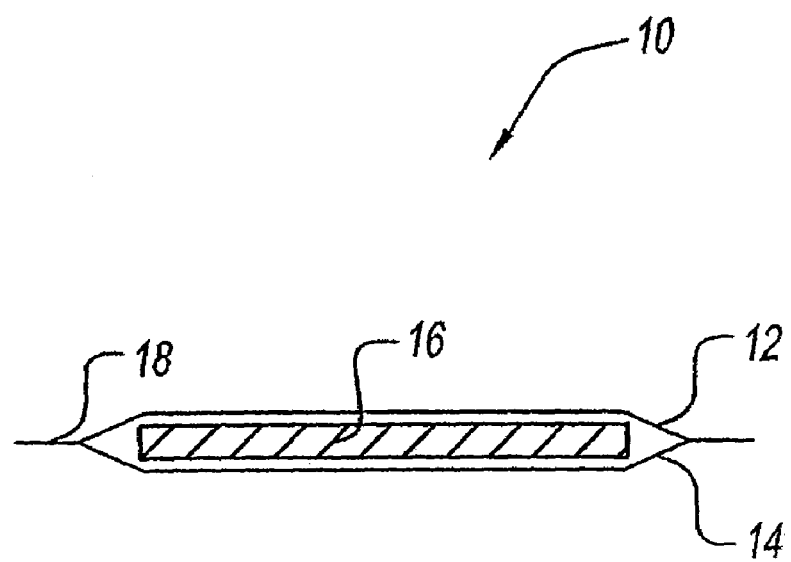
FIG. 1 is a side cut away view of an absorbent food pad.

Referring to FIG. 1, a multi-phase bacterial inhibition food pad of the present invention is represented generally by reference numeral 10. Food pad 10 has a top sheet 12 and a bottom sheet 14 separated by an absorbent core 16. The top and bottom sheets are the outer layers of absorbent pad 10 and can be comprised of film, non-woven fabric, or paper. The top and bottom sheets may be bonded together around a periphery 18 of absorbent pad 10. Top sheet 12 can be micro-perforated or slit. Bottom sheet 14 can also be micro-perforated or slit. Either layer can be liquid impervious. Examples of appropriate films include, but are not limited to, polyethylene, polypropylene, polyester, or any combinations thereof.

Multiple materials can be used in either or both of the top sheet and bottom sheet of the absorbent pad. These multiple materials can be simply adjacent to each other and not bonded except in areas that are heat-sealed. They can also be adhered without adhesive lamination using static attraction and/or corona discharge. The multiple materials may be point bonded, pattern bonded, or intermittently bonded to each other using an about 5% to about 20% bond area to provide attachment but easy separation. Using point bonding and attachment of the multiple layers can provide that the bonding pattern perforates through the outer impermeable film to form a hole having the perimeter of the hole fused between outer and inner materials within the layer. This fusion of the perimeter of the hole provides strength, wicking, and added containment of the absorbent core. Point bonding, using an about 5% to about 20% bond area, of adjacent materials in the layer in a controlled manner allows for certain bonding areas with full penetration through the materials of the layer while providing simple mechanical attachment in other areas of the layer.

The top sheet and/or bottom sheet of the absorbent pad of the present invention can utilize between about two to about seven materials or layers. However, use of a single material is also possible. A preferred material is a co-extruded film of between two and seven material layers. Generally, the interior layer of the multiple layers used is a heat-sealing layer, such as a low-melt polymer layer. The outer layers can be of any thickness. Each outer layer is preferably between about 0.00075 inches and 0.003 inches in thickness. While white is a preferred color, the outer layers can be natural or pigmented in any color, and printing is possible on either surface.

The absorbent core material can be any material suitable for absorbing liquids, particularly food-product liquids. Examples of suitable absorbent materials include, but are not limited to, superabsorbent polymer, compressed SAP composite of superabsorbent polymer granules adhered with one or more binders and/or plasticizers, compressed composite containing a percentage of short or microfiber materials, thermoplastic polymer fibers, thermoplastic polymer granules, cellulose powders, cellulose gels, an airlaid with superabsorbent, any fibrous or foam structure that has been coated or impregnated with a superabsorbent, absorbent structure having one or more starch or cellulose based absorbents, absorbent structure containing superabsorbent material formed and/or crosslinked in-situ, or any combinations thereof. Superabsorbent material can be used in various forms. Examples of suitable superabsorbent material forms include, but are not limited to, granular, fiber, liquid, superabsorbent hot melts, or any combinations thereof. Compressed composites of short and microfiber (from about 0.1 inches to about 0.3 inches in length) materials having between about 3% and about 25% short or micro-fiber content have been shown to strengthen the core for high speed processing but retain the desired properties of low cost and high speed absorption and wicking.

It has also been found that the use of specific polymers that offer high elasticity and/or conformity in the outside layers of the absorbent pad provides an absorbent pad with increased ability to expand during the absorption of liquids. High capacity, shaped absorbent pads that conform to specific packaging dimensions must typically expand in a vertical direction. The volume of the cavity or pocket formed by the upper and lower layers of the absorbent pad generally defines the degree of expansion. Conventional cast or blown films or spunbond non-wovens offer very little expansion. A polyurethane, metallocine polyethylene, and block copolymer (synthetic rubber), which can be cast or blown into a film or extruded into a non-woven (spunbond, meltblown, or any combinations thereof) either individually, as a co-extrusion or a bicomponent formation, or in a blend, have been found to provide increased expansion capability over conventional materials.

The present invention provides an inhospitable environment for bacterial growth by including one or more bacterial inhibitors on or within the multi-phase absorbent food pad. The one or more bacterial inhibitors may be provided in powder and/or liquid form. The bacterial inhibitors can act through a bactericidal or bacteriostatic mechanism and may include organic and inorganic materials, as well as, metallic compounds that function through their ability to disrupt bacterial function and reproduction.

Suitable bacterial inhibitors that may be included in the multi-phase absorbent food pad of the present invention include, but are not limited to, metal, metal compound, surface active agent, surfactant, quaternary ammonium compound, organic acid, inorganic acid, salt, sulfite, biopolymer, synthetic polymer, chitin, chitosan, nisin, enzyme, arginate, diacetate, antioxidant, or any combinations thereof.

The concentration of the one or more bacterial inhibitors to be used in the food pad of the present invention will depend on several factors including, but not limited to, type of protein, expected amount of purge (nominal absorbency of the pad), shelf life of the specific product, type of packaging, and any synergistic effect of the chemicals present in the pad. Generally, the concentration (calculated as a wt. % of absorbed purge that can be absorbed on the pad [nominal absorbency of pad]) will range between about 0.0001 wt. % and about 20 wt. %. In one embodiment according to the present invention, the concentration will range between about 0.01 wt. % and about 15 wt. %, based on the nominal absorbency of the pad. In another embodiment according to the present invention, the concentration will range between about 0.1 wt. % and about 10 wt. %, based on the nominal absorbency of the pad.

Suitable metal and/or metal ion that can be used in the present invention include, but are not limited to, silver, zinc, copper or any combinations thereof. Some commercially available examples include Milliken Alphasian Zirconium and AgION Zeolite ionic silver releasing powders that have obtained FDA approval.

An advantage of using surfactant as a bacterial inhibitor is that it provides both rapid fluid acquisition and effective antimicrobial activity. Ionic surfactant inhibits bacterial growth via electrostatic attraction and bacterial cell membrane disruption. Suitable surfactants that may be used in the present invention include, but are not limited to, anionic, cationic, nonionic, amphoteric, or any combinations thereof. Examples of surfactants include, but are not limited to, alkyl ether sulfates, N-alkyl ester derivatives of certain amino acids, polymeric compounds of quaternary ammonium derivatives, or any combinations thereof.

Suitable quaternary ammonium compound for use in the present invention includes, but is not limited to, one or more compounds of the chemical structure:

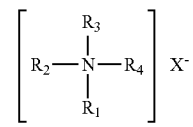

wherein X is selected from the group consisting of: a halogen or a suitable organic or inorganic anion; $R_1$ and $R_3$ is a straight or branched $C_1$-$C_4$ alkyl; $R_2$ is a straight or branched $C_6$-$C_{22}$ alkyl; and $R_4$ is of the chemical structure:

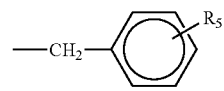

wherein $R_5$ is selected from the group consisting of: H, a straight or branched $C_1$-$C_4$ alkyl group, and a halogen.

One or more quaternary ammonium compounds that conform to the above chemical structures include, but are not limited to, alkyl dimethyl benzylammonium chloride, alkyl dimethyl ethylbenzylammonium chloride, myristyl dimethyl benzylammonium chloride, lauryl dimethyl ethylbenzylammonium chloride, alkyl dimethyl benzylammonium bromide, alkyl dimethyl benzylammonium cetyl phosphate, alkyl dimethyl benzylammonium saccharinate, or any combinations thereof.

Acidification or pH modification of the pad with one or more food grade acids can also present a less hospitable environment to microbial growth. The acid can have both readily available and slow release phases. Suitable acid for use in the present invention includes, but is not limited to, citric acid, sorbic acid, lactic acid, acetic acid, ascorbic acid, oxalic acid, any other compatible carboxylic acid, or any combinations thereof. In one embodiment, citric acid, which is a weak organic acid, can be used for its properties as a natural preservative, antioxidant, and tastemaker. In another embodiment, a combination of citric acid and sorbic acid may be used. The one or more acids may be present in the absorbent food pad according to the present invention in an amount between about 0.1 wt. % to about 7 wt. %, based on the nominal absorbency of the pad. In one embodiment, the one or more acids are present in an amount between about 0.4 wt. % to about 5 wt. %, based on the nominal absorbency of the pad. In another embodiment, the one or more acids are present in an amount between about 1 wt. % to about 3 wt. %, based on the nominal absorbency of the pad.

Suitable antioxidants for use in the present invention include, but are not limited to, BHA (butylated hydroxyanisole), BHT (butylated hydroxytoluene), Vitamin A, Vitamin C, oregano extract as sold under the Oreganox name, natural extracts, natural extract of rosemary, allylisothianate, green tea, or any combinations thereof. These compounds react with free radicals to slow the rate of food oxidation, onset of rancidity in fats and reduce odors. Such a system may also include—in addition to other active ingredients mentioned—odor scavengers that will help increase the period of acceptability of the food product by sequestering objectionable odors.

A salt is any compound with a metal cation (such as Li, Na, K, Be, Mg, Ca, also Cu, Ag, Fe, Ni, etc.) and an anion which can be organic (oxalate, acetate, benzoate, etc.) or inorganic (chloride, bromide, sulfate, phosphate, etc.). Suitable salt that may be used in the present invention includes, but is not limited to, sodium, potassium, calcium, magnesium, lithium, copper, silver, iron, nickel, or any combinations thereof. Preferred salt includes sodium nitrite, disodium EDTA, or combinations thereof.

Suitable sulfite that may be used in the present invention includes, but is not limited to, sulfur dioxide, sodium bisulfate, potassium bisulfate or any combinations thereof.

An important aspect of the present invention is that the multi-phase bacterial inhibiting food pad is reactive in response to the immediate environment. Bacterial growth can be inhibited by varying or modifying the atmosphere in a food package. The atmospheric modification may include increasing carbon dioxide levels, decreasing oxygen levels, or balancing the generation of carbon dioxide with oxygen scavenging to optimize the atmosphere in a food package for bacterial inhibition. By controlling the atmosphere in a food package, the oxidation of the food is significantly slowed and the growth of aerobic bacteria is suppressed, which results in increased shelf life, as well as improved safety and appearance of the packaged food.

Additionally, when a certain level of carbon monoxide is used in the packaging of red meats, the red color or "bloom" is maintained. This color enhances the fresh appearance and therefore the salability of meats. This system allows for inclusion of carbon monoxide generators as well as the inclusion of carbon monoxide scavengers; the prolonged presence of carbon monoxide after it has achieved bloom is undesirable.

To maintain or increase the $CO_2$ levels in a food package, a chemical system can be employed that results in the release of $CO_2$ through a chemical reaction. One such chemical system that can be used in the present invention includes, but is not limited to, a system with an acid and base, that when reacted together, generate $CO_2$. A particular example is a reaction between a stoichiometrically balanced mixture of acetylsalicylic acid and sodium bicarbonate disposed in or on the multiphase bacterial inhibition food pad. Additional bases useful in such a reaction include carbonates, bicarbonates, sodium carbonates, organic bases, or any combinations thereof. Additional acids useful in such a reaction include fumaric, estearic, succinic, citric, or any combinations thereof. It should be understood that any system capable of generating $CO_2$ that is compatible with food and/or food packaging may be used in the present invention. The ratio of acid to base is adjusted to obtain the desired rate of $CO_2$ release. By maintaining one of the components in a ratio other than 1:1 this component becomes the rate-limiting factor. Suitable ratios include, but are not limited to, about 1:5 to about 1:1.

In some applications, it is possible to limit one of the component's availability by "hiding" it within the pad structure.

The $CO_2$ generating chemical system may be present in the absorbent pad according to the present invention in an amount between about 0.1 wt. % to about 12 wt. %, based on the nominal absorbency of the pad. In one embodiment, the $CO_2$ generating chemical system is present in the absorbent pad in an amount between about 0.5 wt. % to about 10 wt. %, based on the nominal absorbency of the pad. In another embodiment, the $CO_2$ generating chemical system is present in the absorbent pad in an amount between about 2 wt. % to about 4 wt. %, based on the nominal absorbency of the pad.

In one embodiment according to the present invention, the chemical system employed to release $CO_2$ includes citric acid and sodium bicarbonate in powder form. They are included in an acid to base ratio of about 1:5 to about 1:1.

To reduce $O_2$ levels in a food package atmosphere, also known as $O_2$ scavenging, any type of system may be utilized that is suitable for use in the present invention. Suitable $O_2$ scavenging systems may include, but are not limited to, metal oxidation reactions, enzyme catalyzed oxidation reactions, or any combinations thereof.

Metal oxidation reactions typically include an oxidizable metal and one or more catalyst components to initiate the oxidation reaction, which results in the removal or scavenging of $O_2$ from the atmosphere of the food package. Oxidizable metals may include, but are not limited to, iron, zinc, copper, aluminum and tin. One or more catalyst components are typically utilized depending on the overall chemical formulation and involve, the use of oxygen and/or moisture, and may optionally include an acidifying or other component.

Enzyme catalyzed oxidation may also be used in the present invention to scavenge $O_2$ from the atmosphere of a food package. By way of example, an oxygen scavenging enzyme system sold under the tradename OxyVac™ by Nutricepts Inc. may be used in the present invention. Enzyme preparations for use in food are typically comprised of glucose oxidase, but can contain substantial amounts of other enzymes such as oxidoreductase, invertase, amylase, catalase, maltase, and cellulose.

Suitable oxidoreductase enzymes for use in the present invention include, but are not limited to, dehydrogenase, oxidase, such as glucose oxidase and hexose oxidase, oxygenase, peroxidase, or any combinations thereof.

An oxygen scavenging enzyme system may be included in the absorbent pad according to the present invention in an amount between about 0.1 wt. % to about 12 wt. %, based on the nominal absorbency of the pad. In one embodiment, the oxygen scavenging enzyme system may be included in the absorbent pad according to the present invention in an amount between about 1 wt. % to about 10 wt. %, based on the nominal absorbency of the pad. In another embodiment of the oxygen scavenging enzyme system may be included in the absorbent pad according to the present invention in an amount between about 2 wt. % to about 8 wt. %, based on the nominal absorbency of the pad.

In one embodiment of the present invention, it has been found that balancing $CO_2$ generation with $O_2$ scavenging to control the atmosphere in the food package results in an effective food preservation system. To achieve this, both a $CO_2$ generation system and an $O_2$ scavenging system are included in the multi-phase bacterial inhibition food pad of the present invention.

This is a very versatile food preservation system, which offers many variations and possibilities. The preferred embodiments will depend on the type of packaging used, the specific protein (or vegetable) under consideration, and the expected shelf life of the product. The system chosen for a specific application may include a bactericidal compound to address the purge captured by the absorbent pad and/or a $CO_2$ generator to provide a bacteriostatic effect on the product on top of the pad, and/or an $O_2$ scavenger to starve any bacteria present on the surface of the product.

Another embodiment of this invention includes an $O_2$ generator capable of increasing $O_2$ concentrations up to four times the normal atmospheric concentration. By way of example, $O_2$ may be generated by a peroxide material or a chemical reaction.

The shelf life enhancing properties of this active system can be categorized as (a) microbiological and/or (b) organoleptic. Any given system will perform either or both functions as defined above depending on the chemical combinations included or disposed in the pad.

In another embodiment of the present invention, the multi-phase bacterial inhibition food pad includes a reaction promoter to initiate the atmospheric modification system of the present invention. The reaction promoter is included within the absorbent pad and attracts moisture to create an environment for initiating the reaction. The reaction promoter is required to stabilize the environment within the preservation system during the manufacturing, transportation and food packaging process. The reaction promoters are aimed at creating a "controlled environment" with low oxygen levels. The requisite chemical reactions for gas modification must begin at packaging, and continue until delivery. For example, when low-moisture food is packaged, the humectants can initiate the gas modification reactions by attracting sufficient moisture.

Suitable reaction promoters for use in the present invention can vary depending on the chemical system utilized, however, they can include, but are not limited to, water, humectants, acids, bases, multi-component systems that react upon contact or exposure to moisture, or any combinations thereof.

Suitable humectants that may be used as a reaction promoter include, but are not limited to, polyethylene glycol (PEG), polypropylene glycol (PPG), and salts thereof, glycerin, glycerol, or any combinations thereof.

In one embodiment of the present invention, a self-propagating agent, which uses water as a by-product of the reaction is used, and thus, allows the reaction to self propagate.

In another embodiment, the reaction promoter can be packaged and "stored" within the multi-phase bacterial inhibition pad. Means for packaging and storing a reaction promoter or any one of the active chemicals in the system, may include, but are not limited to, microspheres, microcapsules, time release capsules designed to dissolve or otherwise release the chemical in a controlled manner, or any combinations thereof.

When microspheres are used, they can be introduced into the multi-phase bacterial inhibiting food pad where they would remain inactive until crushed or ruptured during the food packing process. This agitation or subsequent release would initiate the desired atmospheric modification reaction(s).

In another embodiment of the present invention, moisture may be supplied by injecting a fixed quantity of water into the package at the time of packaging. This addition of water can be automated during the packaging process for activation in low-moisture food packaging. Alternatively, introducing the acidic component of the above-described acid/base $CO_2$ generation system in liquid form can serve the dual purpose of activating the atmospheric modification reaction(s) while maintaining acid-mediated bacterial inhibition.

In another embodiment of the present invention, a food preservation system is provided that synergistically integrates the multi-phase bacterial inhibiting food pad with one or more components of the food package itself, such as, for example, an exterior film overwrap, a lid, a tray, or any other similar container.

A gas permeable film with the ability to slowly release $CO_2$ can be used in combination with an absorbent pad whose gas phase reaction steadily generates $CO_2$ over an extended time of days or weeks to replenish the lost $CO_2$ within the system. Alternatively, a system that uses a film that allows greater entry of $O_2$ into the food preservation system would be combined with an absorbent pad containing a high concentration of antioxidants, $O_2$-scavenger reactions, and/or enzyme catalyzed oxidation reactions to reduce the $O_2$ concentration within the food preservation system.

While the multi-phase bacterial inhibiting food pad of the present invention is generally depicted in FIG. 1, it has been found that by constructing the food pad in contoured and/or complex geometries, several benefits may be achieved. It should be understood that the food pad of the present invention may be constructed in any geometric shape or dimension and may be in a pad on a roll or a continuous pad without sealed edges.

Figure 2:
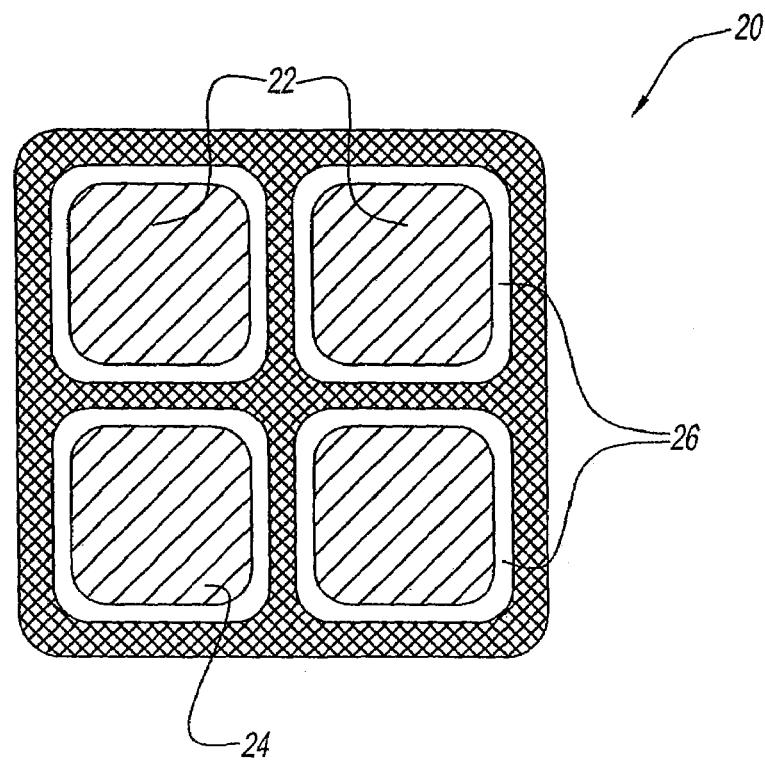
FIG. 2 is top view of an absorbent pad with multiple islands according to an embodiment of the present invention.

Referring to FIG. 2, contoured and/or complex shaped food pad 20 can have one or more islands 22 dispersed throughout the pad. An island is a pocket created by the sealing of the top sheet and bottom sheet of the absorbent pad around absorbent core 24 or other enclosed material. The absorbent core material is in the pocket or island. Benefits of the island or pocket include the control of migration of the absorbent material throughout the pad and promoting integrity to the overall pad. Each island 22 generally has space 26 around the materials enclosed within, particularly in the case of absorbent material, to provide for expansion of the inner materials. The pockets or islands can contain more than one type of absorbent material and/or bacterial inhibitor components.

Each island may itself be a single, double, or multiple-layered island. In a single layer island, the absorbent core is within the pocket. The single layer absorbent core, as well as the pocket itself, can have any contoured and/or complex shape. The pocket and the material held within can be of different shapes. In a double layer island, there is another layer in addition to the absorbent core layer. This second layer can provide additional or improved functionality to the absorbent pad. Examples of additional layers are a wicking layer, transfer layer, bacterial inhibition layer, or simply a layer to enhance the appearance. The second layer can have the same shape and size as the first absorbent core layer. However, the second layer can also have a different shape or size than the absorbent core layer. In a multiple layer island, additional layers are either of the same or different shape and size, to add even more functionality or improved performance to the absorbent pad. When an oxygen scavenger, carbon dioxide generator, antimicrobial or other complex system requires a multi-part chemical system (i.e., part "A" and part "B"), the beneficial utilization of multiple islands or layers is apparent. The physical separation assists in maintaining isolation of the "A" and "B" components until activated by moisture.

The ability to assemble multiple layers or islands along with the potential to incorporate multiple layers of film, paper, nonwoven, etc. solves some difficult problems. For example, the bacterial inhibitors of the present invention are included in single or multiple component systems that need to be maintained in a protected manner either from other components in the system and/or oxygen in the atmosphere and/or moisture and then released or made available when the product is put into use as an absorbent. A solution is provided by using dissolving nonwovens or films to maintain isolation chambers within the pad from the atmosphere or other components. Several raw materials have proven effective as components in dissolving films including polyvinyl alcohol (PVA), chitosan, alginate, pectin, polyamide, cellulose and starches. The ideal materials will be flexible, safe for the ultimate application, heat, ultrasonic or RF sealable on at least one side, and dissolve in room temperature water. Dissolving paper containing conventional cellulose fibers and/or carboxymethyl cellulose (CMC) has also proven effective and can be further enhanced with the application of a film coating from the materials listed above.

In addition, the presence of excess fluid may not be desirable where chemical systems that function well in humid and moist environments cease to function when immersed in fluids or in higher moisture environments. For example, where the food pad employs a multiple layer construction, the first and second layer are contained between the top and bottom sheets and can be separated by a film, paper, or non-woven layer. The film, paper, or non-woven layer can extend beyond the island layers to seal the individual island layers into separate pockets one on top of the other. These separate pockets within the same island can be used to separate the absorbent core from other materials, the chemical systems, which perform better when dry, can be included in the absorbent core. In this embodiment, the film can be a hydrophobic to shield the components from direct fluid contact.

In another embodiment of this application, a separator film, spacer and/or netting, such as those made commercially available by Comweb, is used to provide cells that will enable the active ingredients to be evenly distributed through out the surface of the pad. In addition to providing even distribution, this separator film, spacer and/or netting allows for proper flow of gases in and out of the pad as one gas is generated and another gas is consumed.

Figure 3:
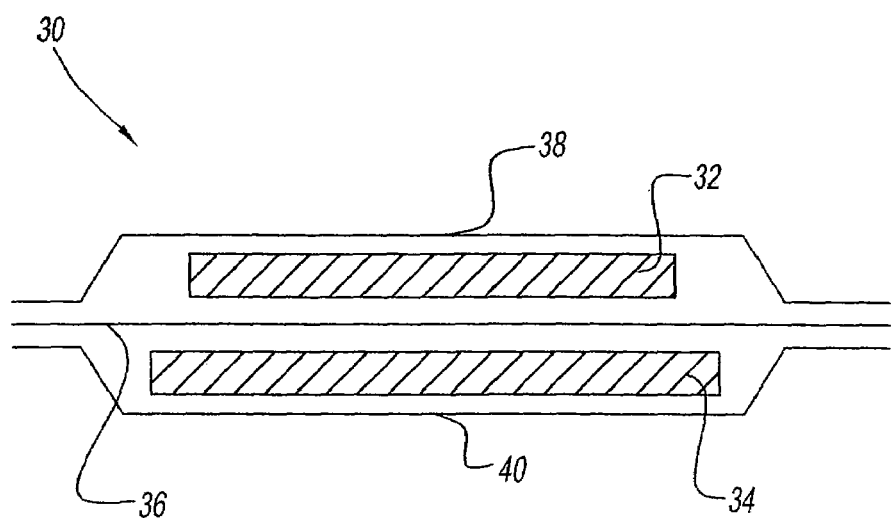
FIG. 3 is a side cut away view of an absorbent pad with two stacked islands according to an embodiment of the present invention.

Referring to FIG. 3, in a double or multiple layer island 30, the first layer 32 and second layer 34, contained between top sheet 38 and bottom sheet 40, can be separated by a film, paper, or non-woven layer 36. The film, paper, or non-woven layer can extend beyond the island layers to seal the individual island layers into separate pockets one on top of the other. These separate pockets within the same island can be used to separate the absorbent core from other materials, such as active agents, which perform better when dry.

The multi-phase bacterial inhibition food pad of the present invention can also have more than one island in the pad itself. The islands can be of the same or different contoured and/or complex shape. The islands can also be of the same or different size. Any combination of size and shape in the islands and the layers in each island is possible. These combinations allow for differing islands to also have different contents in the pouch. For example, an absorbent pad can have absorbent core material in one or more of the islands and one or more atmospheric modification systems in one or more of the other islands. This separation from the absorbent material allows for improved performance of the systems while remaining dry.

Figure 4:
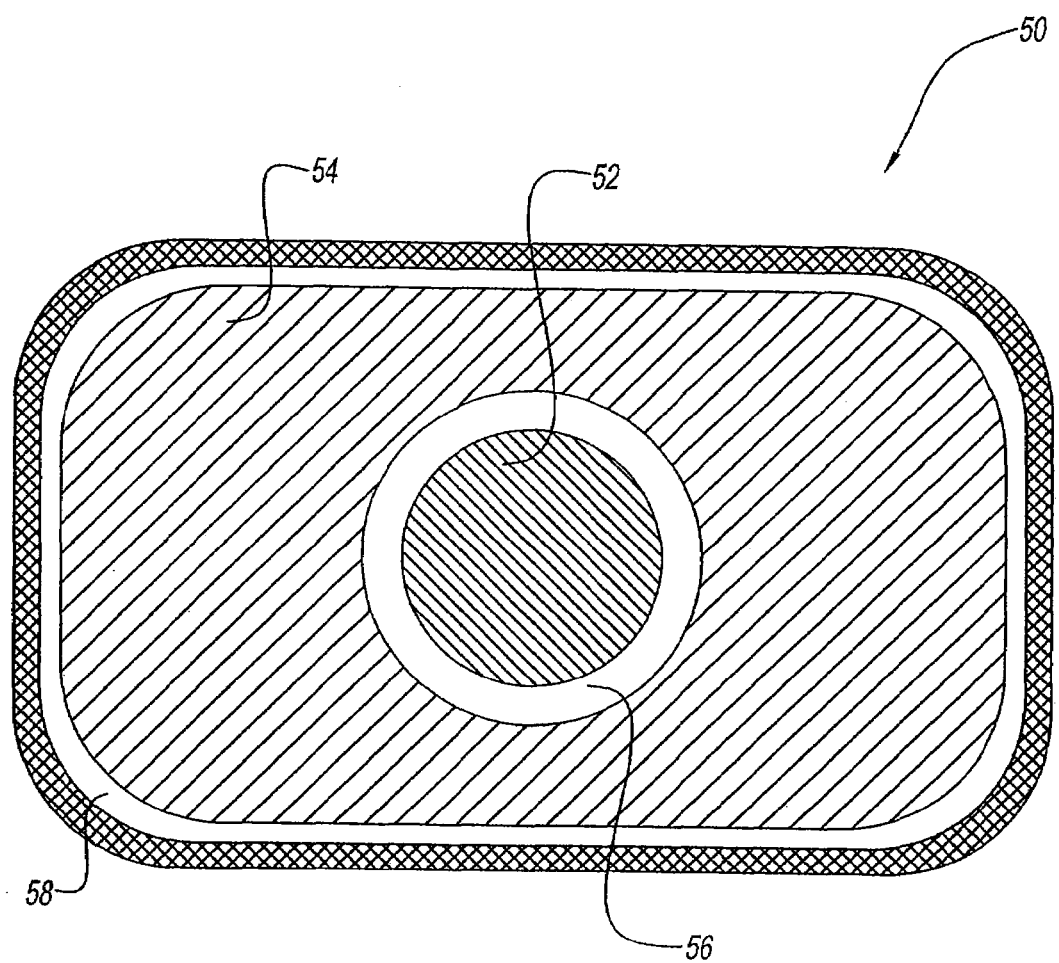
FIG. 4 is a top view of an absorbent pad with two islands of differing shape according to an embodiment of the present invention.

Referring to FIG. 4, an example of an absorbent pad with multiple islands is depicted. Absorbent pad 50 is shown with first island 52 and second island 54. Spaces 56 and 58 allow each island to expand.

Figure 5:
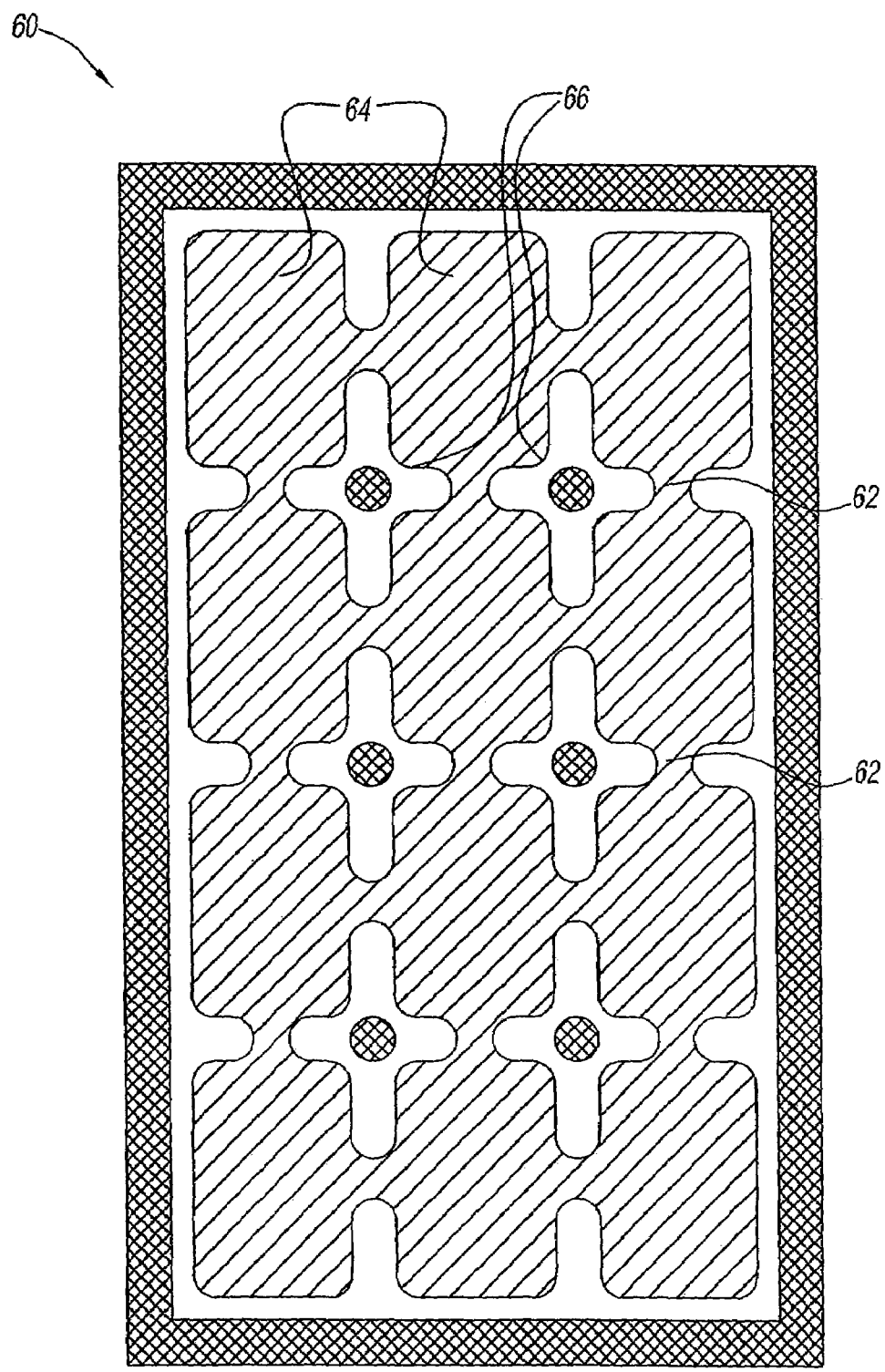
FIG. 5 is a top view of an absorbent pad with multiple connected islands according to an embodiment of the present invention.

Referring to FIG. 5, it is also possible for food pad 60 to have one or more connections or channels 62 between islands 64 to allow controlled fluid flow and/or wicking between the islands. To form the channels 62, internal bonding 66 between the top sheet and bottom sheet can be done.

Figure 6:
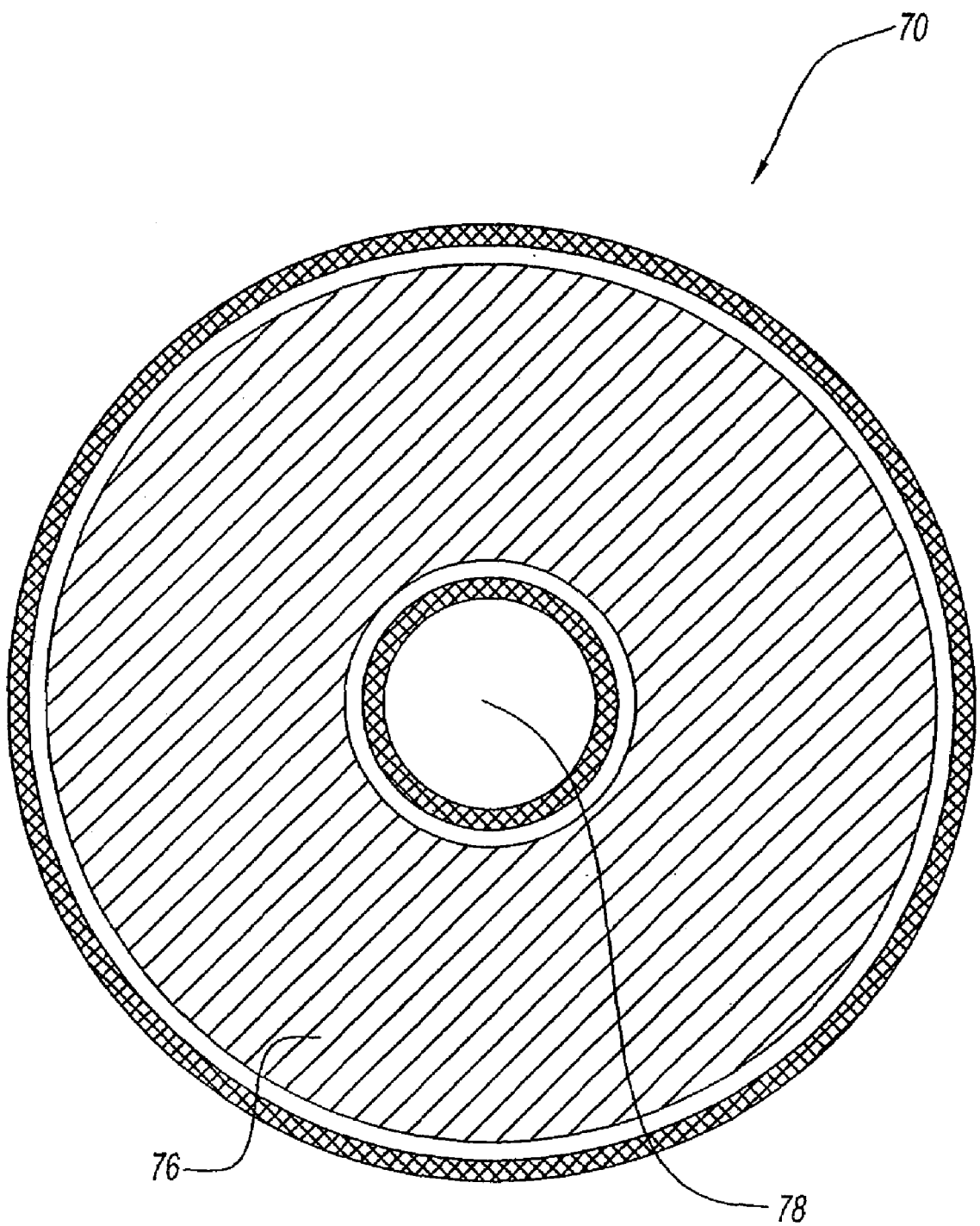
FIG. 6 is top view of a donut-shaped absorbent pad according to an embodiment of the present invention.
Figure 6A:
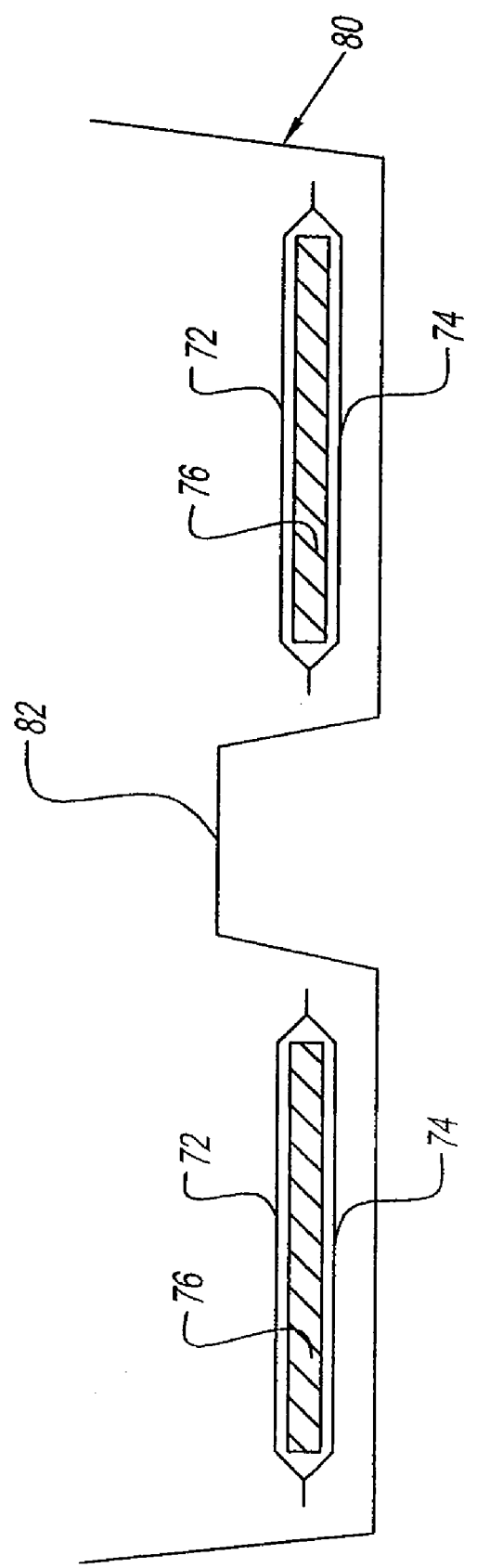
FIG. 6a is a side view of a round package with the donut-shaped absorbent pad of FIG. 6 placed in the round package.

Referring to FIGS. 6 and 6b, food pad 70, outer layers 72, 74, and absorbent core 76 can also be manufactured with cutout or donut-like shapes. A portion 78 of the absorbent pad can be removed to allow more complex shapes or features, such as perforations and folding lines.

As seen by way of example in FIG. 6b, by providing food pad 70 in a donut-like shape, it conveniently fits in a circular or round container 80 having a raised center portion 82.

Figure 7:
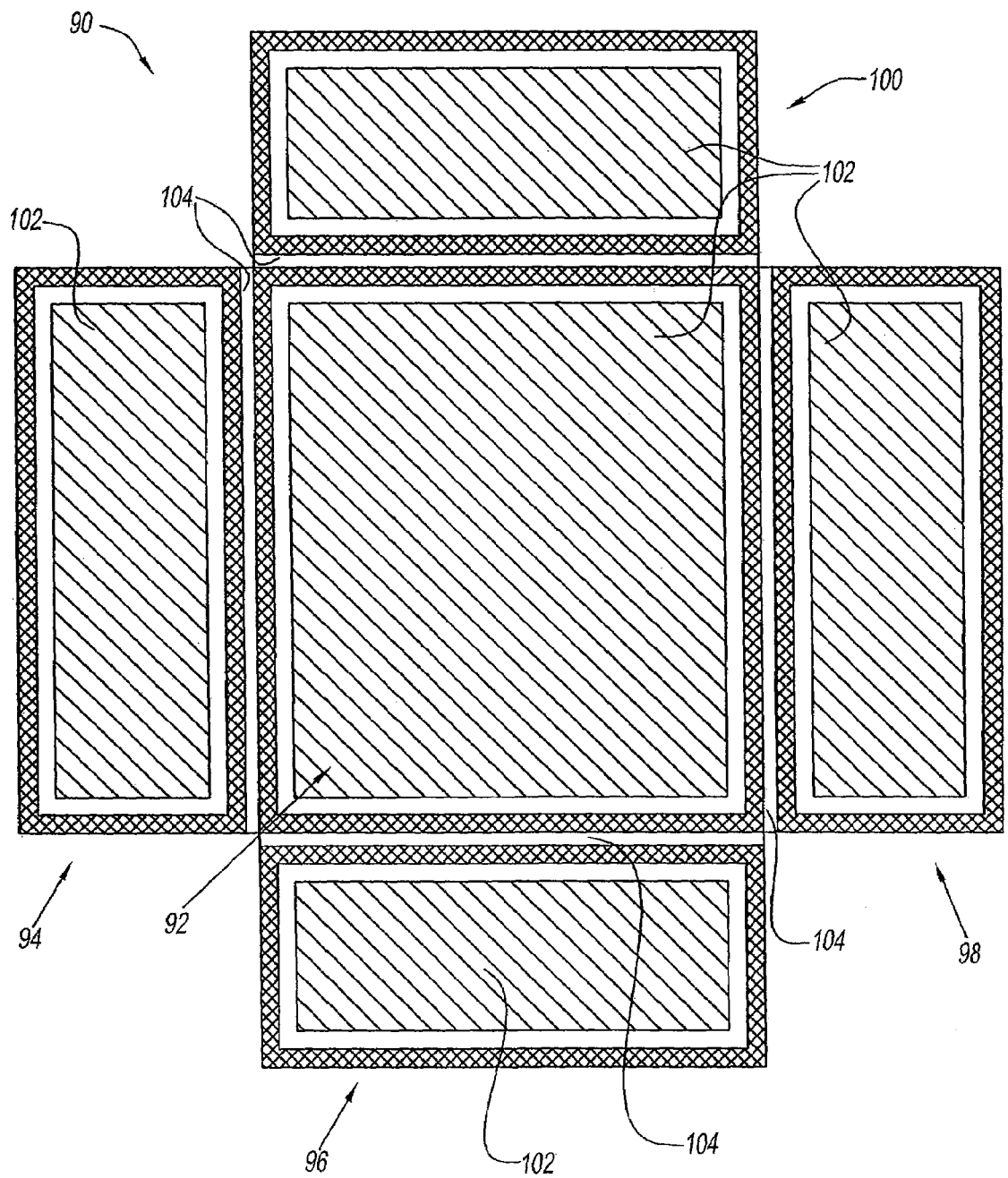
FIG. 7 is top view of an absorbent pad with multiple hinged side panels according to an embodiment of the present invention.

Referring to FIG. 7, particles of the food pad can be removed to allow complex shapes and features, such as folding lines. Food pad 90 has been formed with a main panel 92 and four side panels 94, 96, 98, 100. Main panel 92 and side panels 94, 96, 98, 100 all have absorbent media 102. Each side panel 94, 96, 98, 100 is movably connected to main panel 92 via film connection or hinge 104. Such a configuration allows food pad 90 to be placed in a similarly sized container resulting in food pad 90 covering not only the bottom of the container, but also some portion of the four sides of the container. This is particularly advantageous when it is critical that the integrity of both the bottom and sides of the container be maintained.

By utilizing controlled depth die cutting, also known as kiss cutting, several design variations are possible. Kiss cutting allows certain layers in a structure to be cut and then removed while others remain. One design option available is to allow a layer to protrude beyond others. If this layer were an absorbent or cellulosic material and/or allowed wicking along fiber paths, it could be used to acquire fluid and promote flow into the pad. Another option is to heat seal the top and bottom layers intermittently or in a pattern with voids between the sealed areas. These voids form fluid channels from the outside of the sealed areas into the absorbent core structure. If the upper layer were kiss cut at the perimeter of this sealed area, fluid is not allowed to penetrate the lower film as it is intact and is directed into the pad via these fluid channels.

Figure 8:
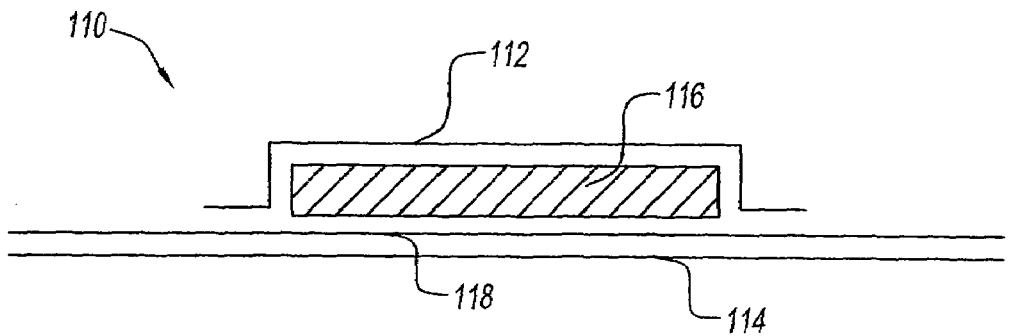
FIG. 8 is a side cut away view of an absorbent pad with a wicking layer that extends beyond the top sheet according to an embodiment of the present invention.

By way of example, referring to FIG. 8, food pad 110 is shown with a top sheet 112, a bottom sheet 114, island 116 and a wicking layer 118 that extends beyond top sheet 112.

Figure 9:
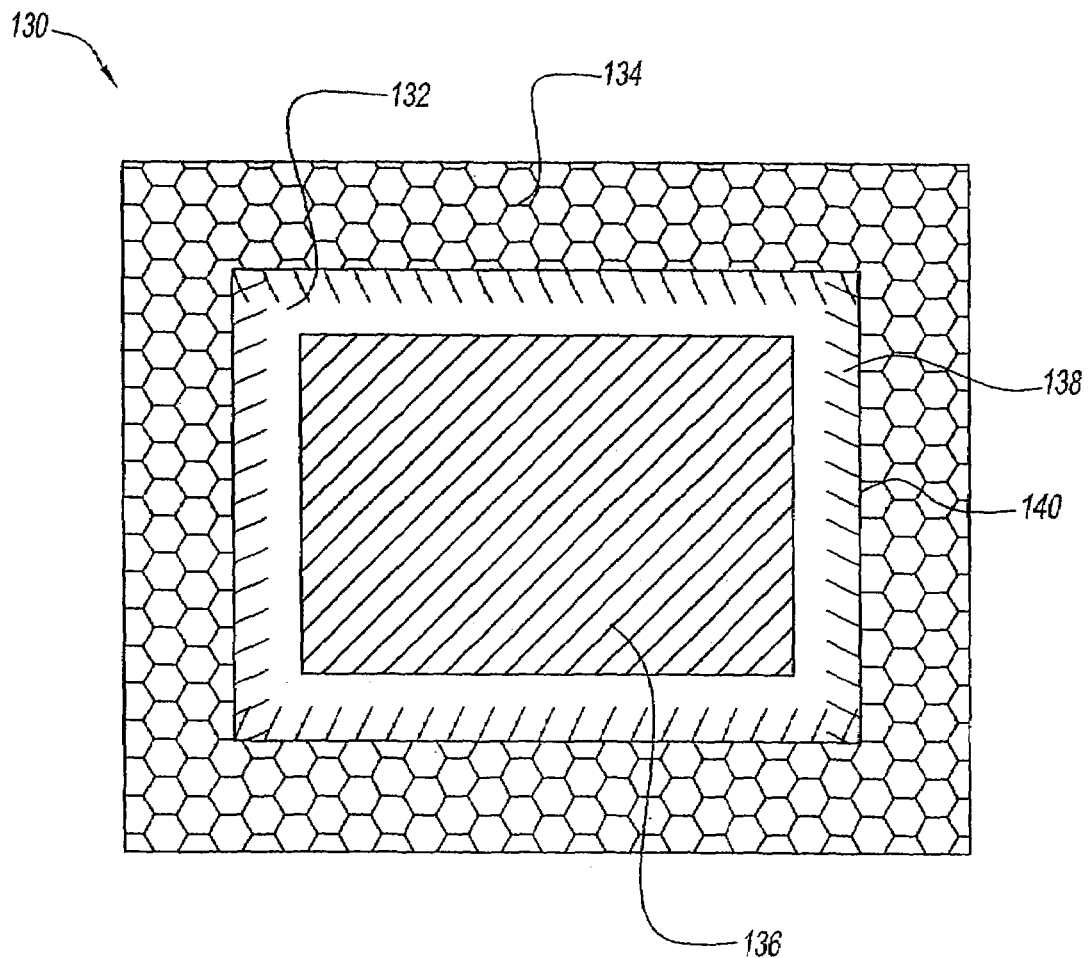
FIG. 9 is a top view of an absorbent pad with a bottom sheet and a wicking sheet that extend beyond the top sheet forming fluid channels according to an embodiment of the present invention.

Again, by way of example, referring to FIG. 9, food pad 130 is shown with top sheet 132, bottom sheet and wicking layer 134 extending beyond top sheet 132 and island 136. An intermittent sealing area 138 is formed, which results in a fluid entry channel 140.

Figure 10:
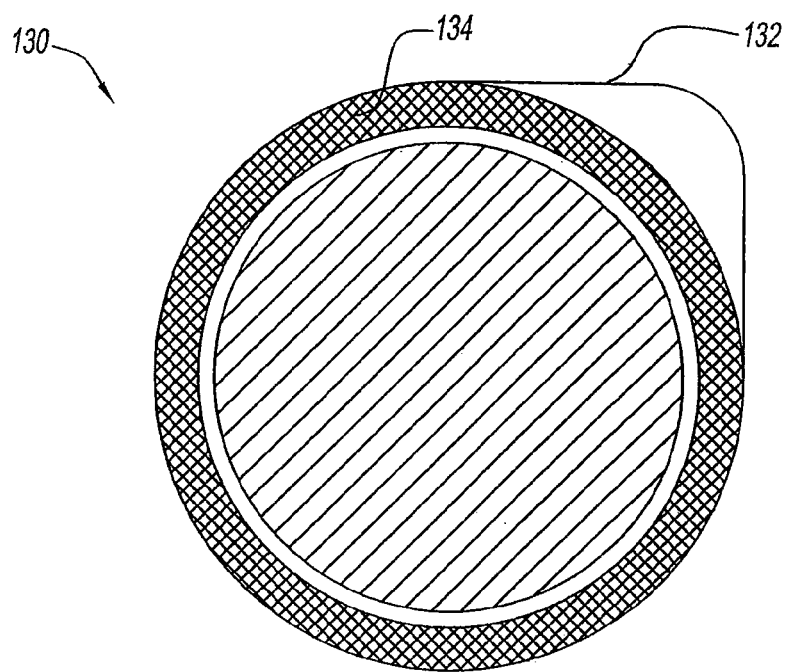
FIG. 10 is a top view of an absorbent pad with a tab extending from the absorbent pad according to an embodiment of the present invention.
Figure 11:
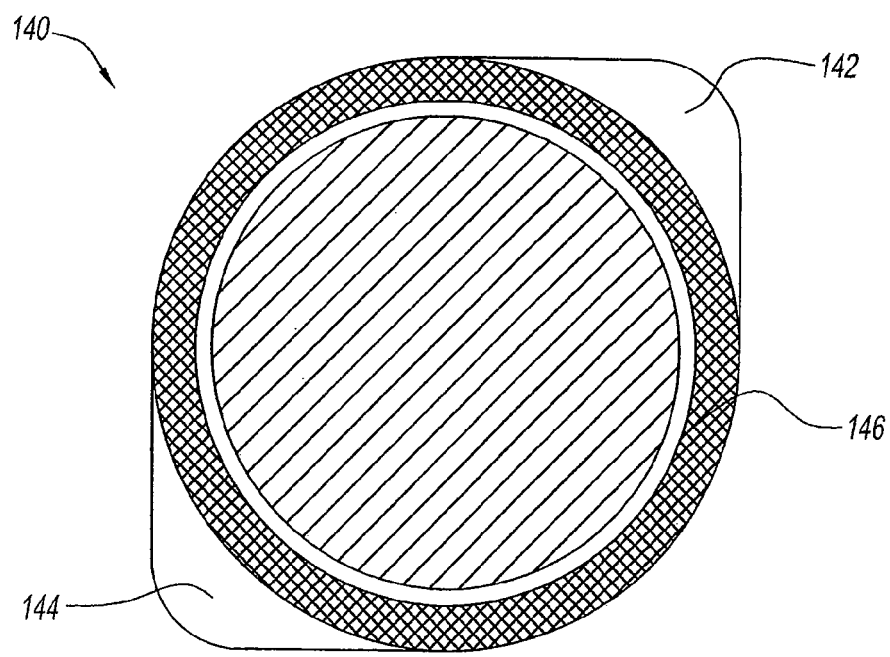
FIG. 11 is a top view of an absorbent pad with two diametrically opposed tabs extending from the absorbent pad according to an embodiment of the present invention.

Food pads according to the present invention with layers of different shapes, sizes, and dimensions provide flexibility and improvement in visual, aesthetic, marketing, performance, and package design characteristics of the food pad. Referring to FIGS. 10 and 11, a layer 132, 142, 144 extending from the outer layers 134, 146 of the food pads 130, 140 can be printed with advertising, printed with label information, and have within it an active component. The ability to integrate a layer extending from the outer layers of the food pad into overall food packaging design provides design options that are visual, functional, and performance related.

Rotary dies and vacuum anvils controlled by a customized computer-driven servo drive system allow the cutting and placement of all components necessary to fabricate any one of these unique food pads of the present invention. Rotary motion, intermittent motion, reciprocal motion, or the combinations of these motions can be used to manufacture various contoured and/or complex shaped food pads. A preferred hybrid combination of rotary motion in an intermittent format with the added utilization of vacuum conveyers provides exemplary results.

An additional advantage to manufacturing the multiple-phase bacterial inhibition food pads of the present invention is that the waste or matrix cut out around islands can be reclaimed and recycled. This is especially important with the expensive absorbent core and "active" component materials.

The top sheet and bottom sheet of each food pad of the present invention can be sealed together at the edges of the pad, at the outside of each island or pocket, or at various locations throughout the pad. It has been found that to prevent seam failure that is prevalent in conventional pads due to the swelling of the absorbent core, proper sealing of the top sheet to the bottom sheet can be obtained through adhesives, heat, pressure or ultrasonic sealing. These methods provide a solid bond capable of resisting bursting. An embossing, knurling, or point-bonding pattern can be used for even stronger and more flexible bonds than simple flat bonding.

Thermal sealing can provide a strong seam with a minimal amount of material from the top and bottom sheets. Using adhesives to bind the top sheet to the bottom sheet typically requires between about 0.25 inches to about 0.5 inches of material from the top and bottom sheets to create a sufficient seal. However, seals formed by this traditional method are prone to failure when the pad absorbs fluid and exerts stress on the seal. The methods of the present invention provide for strong sealing using only about 0.125 inches to about 0.5 inches of material to create the seams.

It has also been found that to further improve the heat sealing of film, non-woven, or paper layers it is possible for the film to be co-extruded, the non-woven to be bi-component, or the paper to be coated with a low-melt material. Generally, the low-melt materials, such as polymers, are on one side of the layer and are positioned toward the center of the pad. The low-melt materials can be on both layers to be sealed or on only one of the layers. It is preferred that both layers to be sealed have low-melt materials. A preferred co-extruded film is of a high-density polyethylene (HDPE) with an ethylene vinyl acetate (EVA) component on the low-melt side. A preferred thickness for these films is between about 0.0075 inches to about 0.003 inches. The layers can be corona treated to promote ink anchorage and seam bonding. Techniques for sealing the layers include conventional heat/pressure, thermal impulse sealing, radiant surface heat followed by pressure or heat/pressure, ultrasonic sealing, or any combinations thereof. An example of a combination of techniques is ultrasonic sealing preceded by thermal or radiant heat application.

It is possible to register or pattern-print the low-melt bond promoter or an adhesive at any point in the food pad in any shape or configuration. A rotary or intermittent printing process of any type could be used to achieve this outcome. In high-speed processes, a conventional gravure/doctor blade system was shown effective. For low-melt films or materials, a roll coat/Flexo print device is preferred, although a screen print process is also suitable. Using this device, coatings are generally between about 0.00075 inches to about 0.010 inches in thickness. Adhesives can be pattern printed or fiberized to minimize application rates, or can be applied via a slot die, roll coater or extrusion system to provide a continuous sheet or coating. Conventional hot melt adhesives are typical however additional strength can be gained with the use if crosslinking hot melts that react and chemically cross-link under the influence of UV light or e-beam energy. When these energy sources are utilized, a side benefit is realized via the sterilization of the pads.

One or more of the outer layers of each food pad of the present invention may be perforated to allow for fluid transport across the layer. One method of perforating the materials of the outer layers involves "cold needle" perforation at ambient temperatures. However, holes created with a "cold needle" technique can lack a desired three dimensional characteristic that typically add rigidity to the layer, resist closure of the hole, and provide for easy entry but difficult exit of liquid from the absorbent pad. Using either an ultrasonic pattern roll and anvil process, as depicted in FIG. 12a, or a hot-needle process, as depicted in FIG. 12b, to perforate the layers provides a thermally set hole that resists future movement or closure of the hole.

Figure 12A:
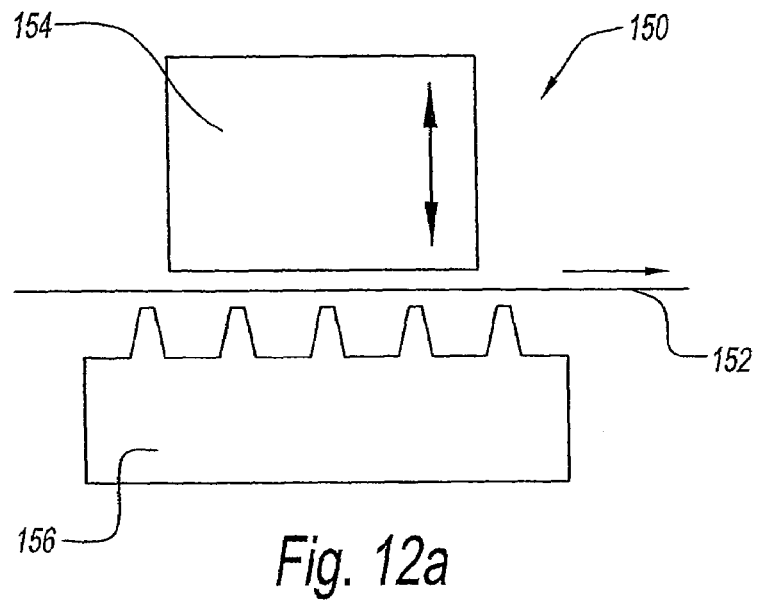
FIG. 12a is side view of an ultrasonic perforation apparatus for making an absorbent pad according to an embodiment of the present invention.

Referring to FIG. 12a, an ultrasonic apparatus 150 is shown. A sheet of material 152, which can ultimately form either a top sheet or bottom sheet of an absorbent pad according to the present invention is shown traveling horizontally between an ultrasonic horn 154 vibrating vertically and a heated anvil or rotary tool 156.

Figure 12B:
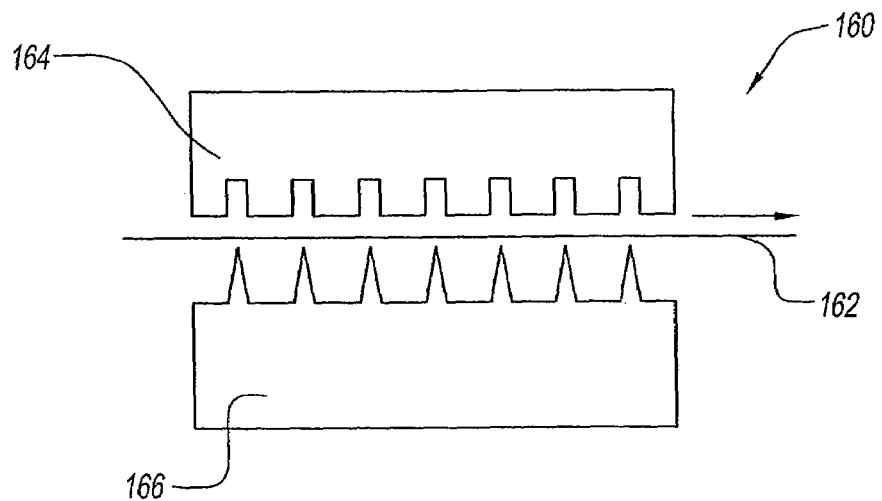
FIG. 12b is a side view of a hot or cold needle perforation apparatus for making an absorbent pad according to an embodiment of the present invention.

Referring to FIG. 12b, a hot-needle apparatus 160 is shown. A sheet of material 162, which can ultimately form a top sheet and/or bottom sheet of an absorbent pad according to the present invention, is shown traveling horizontally between a female recessed backup roll 164 and a heated pin roll 166.

Figure 13:
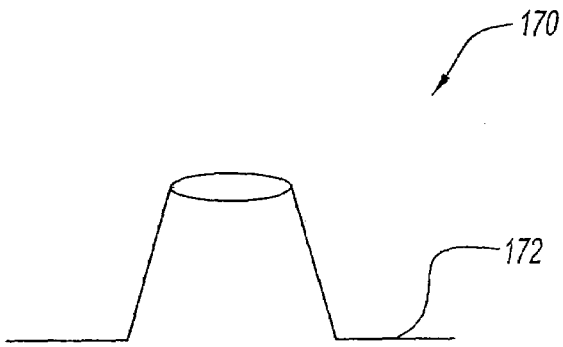
FIG. 13 is a side view of a conical perforation formed on an absorbent pad according to an embodiment of the present invention.
Figure 14:
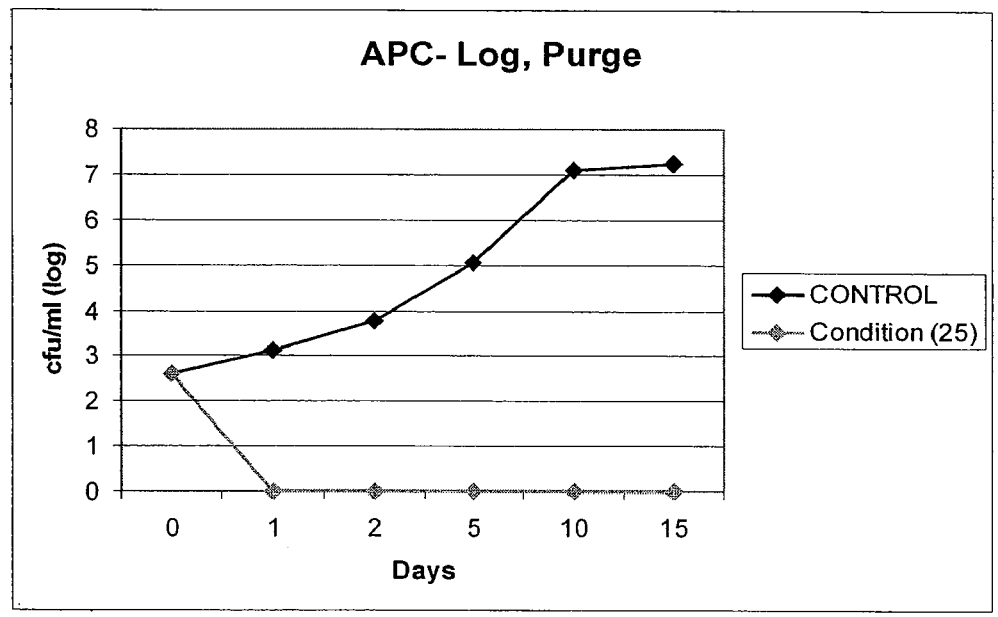
FIG. 14 is a graph depicting the aerobic plate counts (APC) for a purge over a period of time for a control sample and an absorbent pad according to an embodiment of the present invention.
Figure 15:
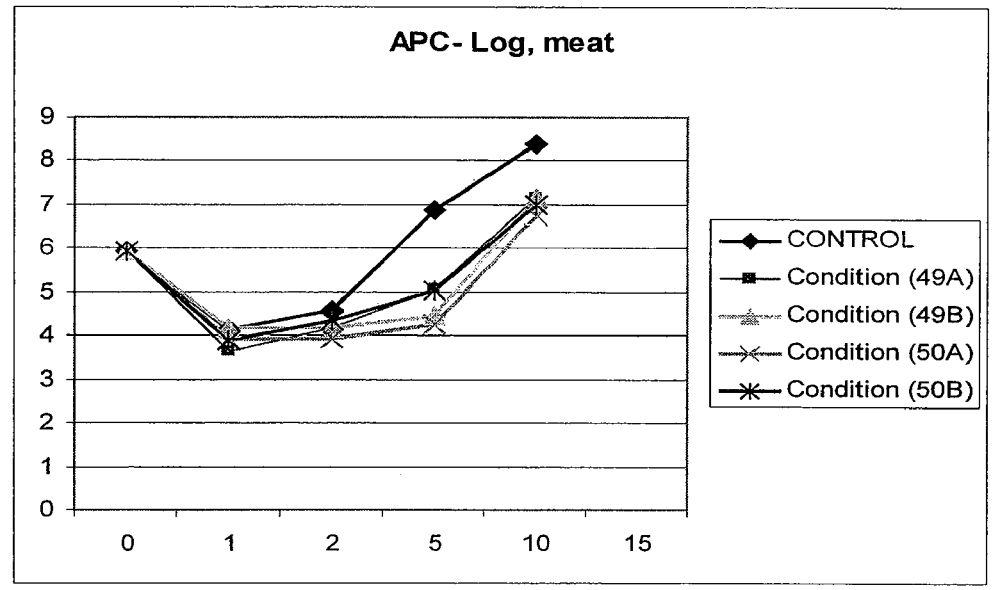
FIG. 15 is a graph depicting the aerobic plate counts (APC) for a meat over a period of time for a control sample and two absorbent pads according to other embodiments of the present invention.
Figure 16:
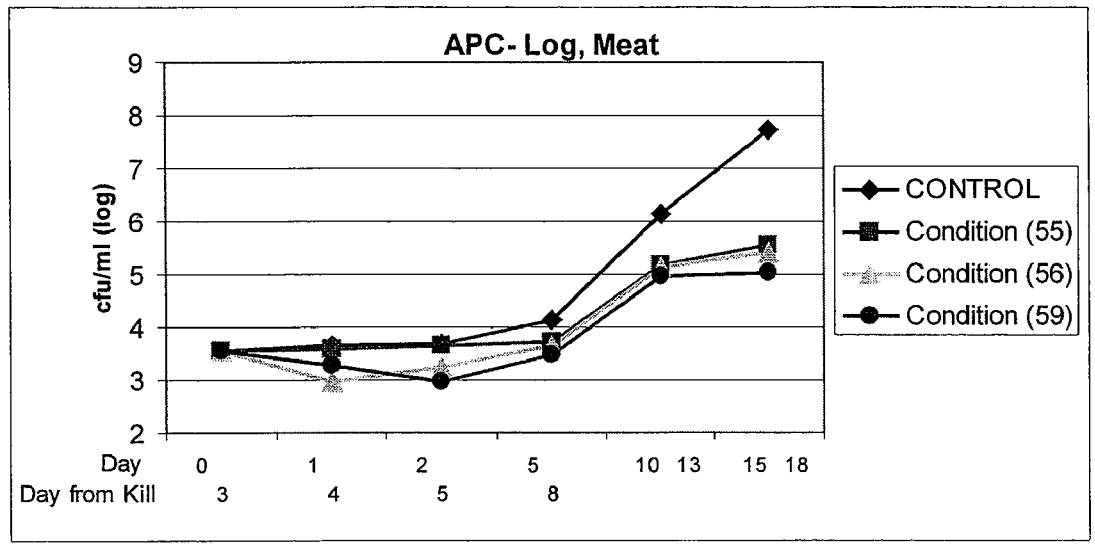
FIG. 16 is a graph depicting the aerobic plate counts (APC) for a meat over a period of time for a control sample and three absorbent pads according to other embodiments of the present invention.
Figure 17:
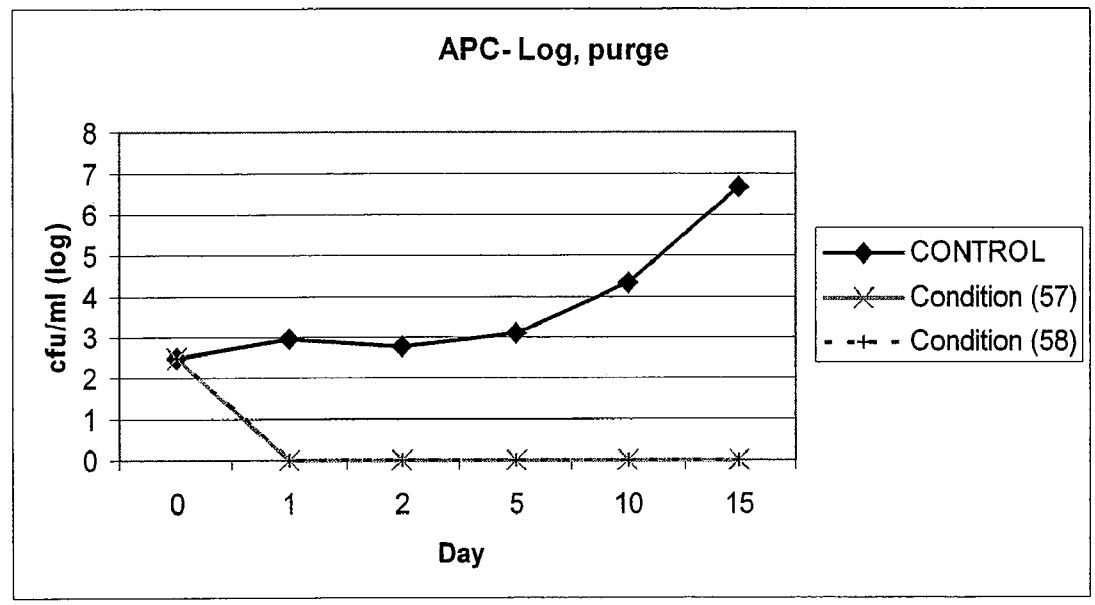
FIG. 17 is a graph depicting the aerobic plate counts (APC) for a purge over a period of time for a control sample and two absorbent pads according to other embodiments of the present invention.
Figure 18:
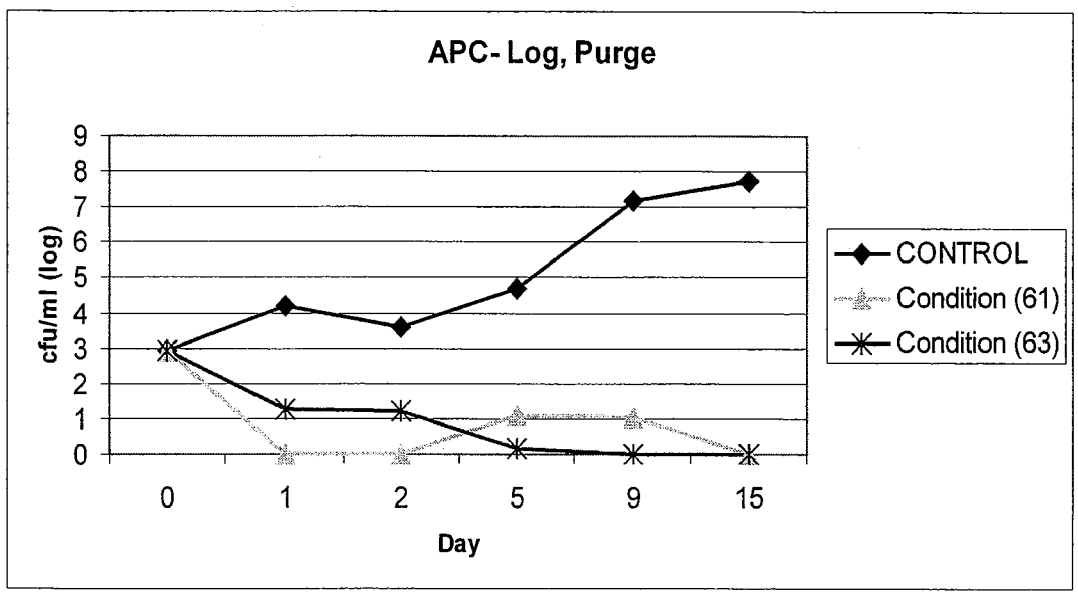
FIG. 18 is a graph depicting the aerobic plate counts (APC) for a purge over a period of time for a control sample and two absorbent pads according to other embodiments of the present invention.
Figure 19:
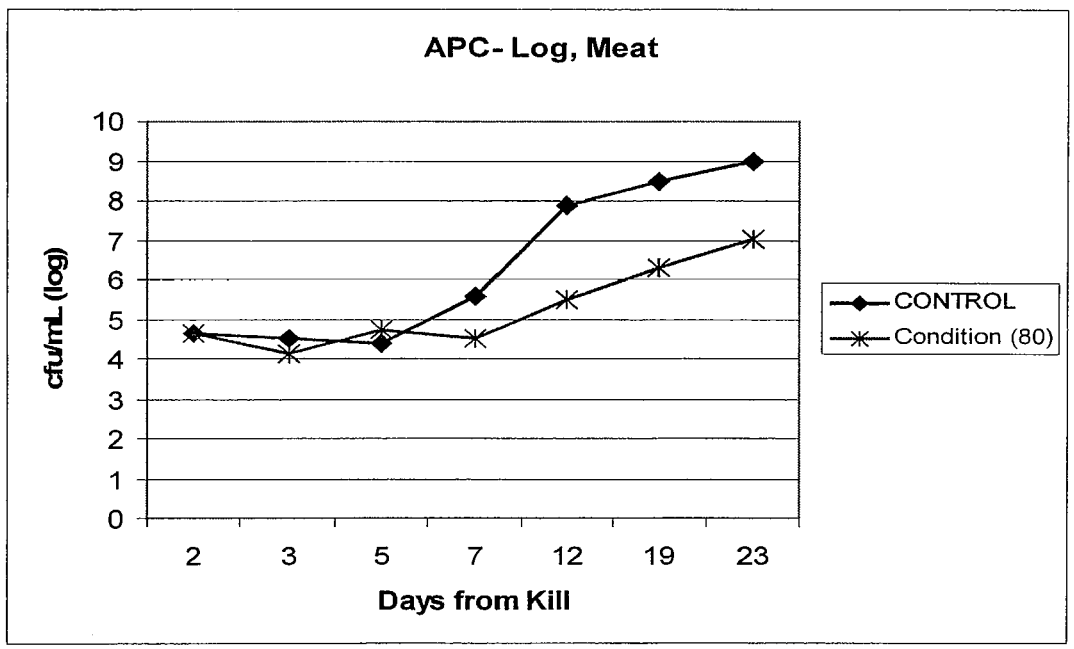
FIG. 19 is a graph depicting the aerobic plate counts (APC) for a meat over a period of time for a control sample and an absorbent pad according to another embodiment of the present invention.
Figure 20:
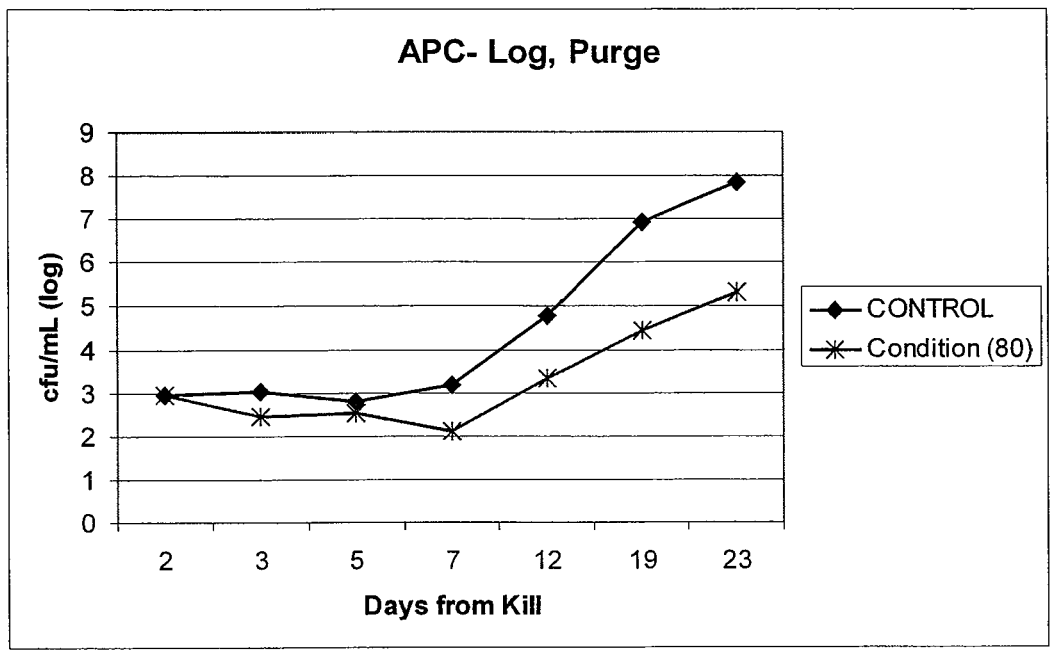
FIG. 20 is a graph depicting the aerobic plate counts (APC) for a purge over a period of time for a control sample and an absorbent pad according to another embodiment of the present invention.
Figure 21:
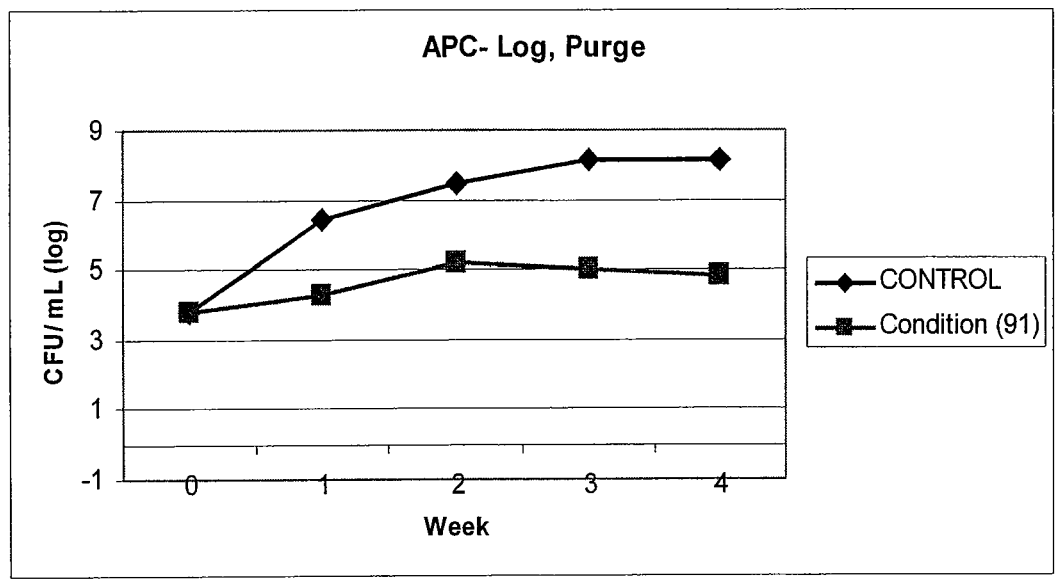
FIG. 21 is a graph depicting the aerobic plate counts (APC) for a purge over a period of time for a control sample and an absorbent pad according to another embodiment of the present invention.
Figure 22:
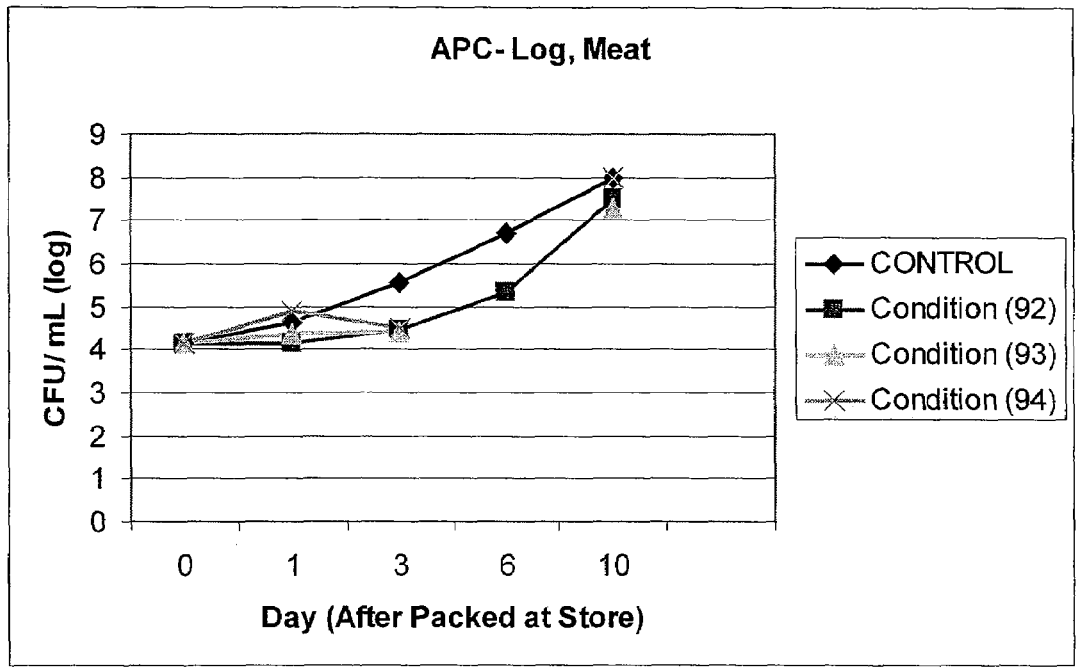
FIG. 22 is a graph depicting the aerobic plate counts (APC) for a meat over a period of time for a control sample and three absorbent pads according to other embodiments of the present invention.

Referring to FIG. 13, by perforating the material used to form the top sheet and/or bottom sheet of the food pad, a conical perforation 170 is formed. Such a conical perforation in a film layer 172 promotes wicking into the absorbent island or core of the food pad and deters absorbed liquid from emanating out of the absorbent pad.

The present invention provides for improved perforation by controlling the design of the perforations to the size and shape of the particular absorbent pad. Conventional perforation covered the entire surface of material used to manufacture the pads. The absorbent pads of the present invention can be perforated in any desired pattern. Perforations that are intentionally random in pattern, such that the holes do not line up substantially in any direction, are preferred where prevention of layer tearing is desired. The layer can be perforated in such a manner that the area to be sealed is left without perforations, target zones for controlled fluid uptake are created, perforations of different shapes and sizes are formed, or any combinations of the foregoing. The perforations can be large window-like holes that directly expose the inner components of the pad, such as an absorbent material, active component, or fluid acquisition/transfer/transport layer. Within the same pad, perforations can vary in pattern and size. Using small holes or micro-perforations (for example smaller than about 0.01 inches) near the center of the pad where the food will come into contact with the pad, can help minimize the desiccation effect, while larger holes near the perimeter will facilitate greater absorption of fluid run-off into the absorbent core.

The food pads of the present invention may also employ static charges to adhere various layers of the absorbent pad together. This improvement over the conventional use of glues and adhesives provides improved product safety via elimination of adhesive components, manufacturing advantages, cost reduction, and product improvement through stronger seal integrity. Using static electricity, typically involving emission of negative ions, the shaped absorbent core material or other internal components can be adhered electrostatically to the top sheet, bottom sheet, or other layer of film, non-woven, or paper material employed in the food pad. This electrostatic adhesion usually occurs prior to the heat-sealing phase. The need for adhesive is thus eliminated. In double and multiple layer island or shaped food pads, all layers involved in the island, as well as the outer layers, may be adhered electrostatically.

The static generator can be variable in its power output and can be turned on and off frequently via computer or electronic control. This allows for spot treating the layers with static charge. Spot treatment can prevent application of static charge to areas or materials of the food pad that do not tolerate static or areas where the presence of static is problematic from a manufacturing viewpoint.

Static charge can also be employed in the food pad, typically through positive ion emission, to repel or space apart two materials. This repulsion can be useful in a variety of applications in the absorbent pads of the present invention. Examples of these applications include, but are not limited to: maintaining an opening between two layers, allowing a tab or handle that is formed with the pad to stand away from the other layer for ease of use, and simplifying handling and processing.

The layers of the food pads of the present invention may be corona treated. Corona treatment of film, non-woven, and coated or treated paper surfaces is generally used to promote improved ink anchorage in printing. It has been found that corona treatment of the inside surfaces of film, non-woven, and paper layers in the shaped absorbent pads without adhesives improves adhesion during the heat sealing stage. Not being limited by this theory, it is believed that corona treatment reduces the surface tension.

Corona treatment involves exposing a gas situated in an air gap between an electrode assembly and a treater roll to a very strong electrical field to break down the gas and cause it to lose its insulating capability. During the breakdown, the gas molecules begin to ionize, which enables the gas molecules to become conductive. When a sufficient number of gas molecules have become ionized, a conductive path is generated between the electrodes causing a sudden discharge across the path resulting in a bright flash or arc. A solid dielectric barrier of sufficient material is place between the electrodes to interrupt the conductive path and prevent the arc and the complete breakdown of the gas molecules. This causes, instead of a hot localized arc, a cooler diffuse glow. The soft colored discharge is called a corona and indicates the incomplete breakdown of the gas. Substances to be treated, such as the surfaces of film, non-woven, and paper layers in the shaped absorbent pads of the present invention, are passed into the corona field where it is exposed to the high voltage discharge and the bombardment of high energy particles. The corona field has the ability to break polymer bonds, cause micro-pitting, and deposit an induced surface charge with extremely high levels of strong oxidizing agents onto the substance. Corona treatment can alter the surface characteristics of the substance allowing for enhanced surface adhesion and acceptance of printing inks, adhesives, coatings, and the like. The combination of corona treatment and electrostatic attraction provides for superior pad formation.

It has also been found that the use of specific polymers that offer high elasticity and/or conformity in the outside layers of the food pad provides an absorbent pad with increased ability to expand during the absorption of liquids. High capacity, shaped food pads that conform to specific packaging dimensions must typically expand in a vertical direction. The volume of the cavity or pocket formed by the upper and lower layers of the absorbent pad generally defines the degree of expansion.

Conventional cast or blown films or spunbond non-wovens offer very little expansion. A polyurethane, metallocine polyethylene, and block copolymer (synthetic rubber), which can be cast or blown into a film or extruded into a non-woven (spunbond, meltblown, or any combinations thereof) either individually, as a co-extrusion or a bicomponent formation, or in a blend, have been found to provide increased expansion capability over conventional materials.

The food pads of the present invention may be constructed by any method appropriate to result in the unique features of these absorbent pads. In general, raw materials are brought to the processing line in rolls. The materials are converted into the absorbent pads of the present invention. Waste material, such as scrap matrix, are sent either directly to a compactor or recycled depending on the material content. Finished pads are processed in one or more of several ways including: cut into individual pieces and packaged in bulk, connected together with perforations and wound onto a roll or spool for downstream processing, connected together with perforations and placed into a bin or carton for downstream processing, or placed into a tube or magazine for later insertion into a high-speed placement device.

Additional combinations and methods of manufacture are possible as provided in co-pending application Ser. No. 10/802,254, which describes shaped absorbent pads, its entire disclosure of which and is incorporated by reference herein.

The present invention is exemplified below. It should be understood, however, that the following examples are not intended to limit the scope of the present invention.

EXAMPLES

Various absorbent food pads were made according to the present invention and tested to show the effectiveness of the absorbent food pads in bacterial inhibition and/or food preservation.

General Testing Protocols

The following general testing protocols were used to evaluate the effectiveness of various absorbent food pads made according to the present invention.

Experimental Approach

A. Materials

Meat and Poultry

Two general types of tests were performed: one using fresh meat from a processor, and another using meat purchased from a supermarket.

i. From Processors: Fresh cut, chilled chicken, pork or beef, were obtained from a local processor Chicken carcasses or meat parts were processed per the plant's standard operating procedures. Product was held at 36-40° F. until used in the study.

ii. From Supermarkets: Meat was purchased from a local supermarket the same day of starting the study. The Supermarket Meat Manager was provided with control and test pads and asked to place both in trays with meat derived from primal cuts of meat.

Active Pads

Different types of active pads are made by varying the pad architecture, materials, chemistry, and relative concentrations.

i. Architecture and Materials: Different layers of PPI's tissue can be used to change the absorbency levels of the pad. In addition, other materials, such as non-wovens, spacers, modified tissue, etc. can be used to change the physical properties of the pads.

ii. Chemicals: The active ingredients in the pad can be added during the manufacturing of the pad in different layers to accommodate reaction and mixing requirements, as well as availability of the chemical to incoming moisture.

Packaging Materials and Equipment.

Sealable "Meat Tray # 3" from APT (Part #: 3-1.7M)

Materials: Cpet/Pe

For Supermarket applications, non-barrier foam trays were used.

Curpolene 600N (Spec 7030) film from Curwood was used. This film has a Seal Strength of 4000 gm/in @ 285° F., 20 psi & 1 sec. Barrier properties: OTR: $O_2$<2.0 cc per 100 $in^2$ per 24 hrs @ 73° F. & 0% RH. Other Curwood films with lower or higher OTR were used depending on the application tested.

Absorbent pads available through Paper Pak Industries (UZSP 75 gram) were used as control and also modified to run specific activity tests. Other Paper Pak Industries pads of different absorbency levels, sizes and architecture can also be used depending on the application.

A "Hix" Heat Transfer Press Model: HT400 with the base plate modified to accept test trays was used to seal the film to the tray. Seal conditions were 285° F. @ 35 sec.

A Mocon Pac Check® 325 oxygen/carbon dioxide meter was used to monitor package headspace composition during the study.

Gas Flushing

For certain applications, it is necessary to gas flush the trays before sealing them. Gas flushing is attained by allowing a flow of nitrogen to circulate through the tray for a certain period of time (measured with a chronometer) at a given flow (measured with a flow-meter) and then sealing the tray immediately thereafter.

B. Sample Preparation, Handling and Storage

Purge Tests

Purge tests were performed to evaluate the efficacy of the antimicrobial mix. The sample is prepared by diluting the liquid exudates from two commercially available whole chickens into 250 ml of culture broth and allowing the mix to sit at room temperature for 3-4 hours. This will typically render a starting bacterial load of 3,000 to 5,000 cfu/ml.

Chicken Breasts

One chicken breast was placed in each tray with the designated pad, the pad was then inoculated with 45 ml of chicken exudates from the original package, and then sealed using the semi-barrier film. Product was stored at 40° F. (4.4° C.) and microbial-, chemical-, and organoleptic analyses were performed at different intervals.

For each set of experimental treatments, a set of trays with non-treated pads was run to serve as microbiological, chemical and sensory controls at each storage interval. All microbiological tests were run in duplicate. One sample of each pad treatment (including the control set) was microbiologically analyzed and organoleptically evaluated immediately after packaging (time-0) and the remaining samples stored at 40° F. All samples were evaluated in duplicate (i.e., 2 microbial tests on each sample) for each pad variable (including the control set), also chemical and organoleptical evaluations were performed at different time intervals.

Meat Samples—Supermarket Tests

One meat sample was placed in each tray with the designated pad, and then sealed using a non-barrier film. Product was stored at 40° F. (4.4° C.) and microbial-, chemical-, and organoleptic analyses were performed at different intervals. For each set of experimental treatments, a set of trays with no pad was run to serve as microbiological, chemical and sensory controls at each storage interval. All microbiological tests were run in duplicate.

One sample of each pad treatment (including the control set) was microbiologically analyzed and organoleptically evaluated immediately after packaging (time-0) and the remaining samples stored at 40° F. All samples were evaluated in duplicate (i.e., 2 microbial tests on each sample) for each pad variable (including the control set), also chemical and organoleptical evaluations were performed at different time intervals.

Note: Depending on the application and on the type of meat, in some cases 2 ml of distilled water were used to activate the pad.

C. Sample Analyses

Microbiological

Prior to opening, the headspace of each package is aseptically tested for oxygen and carbon dioxide (see below). After headspace testing, packages trays were aseptically opened for sample collection. At time-0, the product in each test was microbiologically analyzed; by placing it in a sterile stomacher bag, diluting 1:10 (or 1:100) with sterile BPB, stomaching for 1 min. and analyzing the rinsate to determine initial contamination level.

For each product after time-0, both the product and the pad in each package were analyzed (separately). The product in each package was aseptically placed in a sterile stomacher bag with 10 ml of sterile Butterfield's Phosphate buffer (BPB) diluent. Samples were thoroughly shaken and massaged by hand for 1 min. and the rinsate serially diluted in BPB as required.

In addition, the pad in each package was aseptically placed in a tared stomacher bag; any liquid in the pad was then be extracted via squeezing and the pad separated from the extracted liquid. The liquid extract was microbiologically analyzed and the pH of remaining liquid in the bag was tested (if sufficient volume).

Product sample rinsates and pad extract samples were assayed for Aerobic Plate Counts (incubated at 37° C. for 2 days). The same procedure was followed with the control sample (chicken sample with a non-treated pad). All microbiological analyses were performed using the 3M Test Method.

All counts were expressed as CFU (colony forming units) or $\log_{10}$ CFU per ml of sample rinsate. Counts can also be expressed on a CFU/gram or CFU/package basis.

Chemistry

Prior to opening, the headspace of each package was aseptically tested for oxygen and carbon dioxide at each time interval using the Mocon Gas Analyzer.

After 0, 1, 2, 5, 10, and 15 days of storage (or other appropriate time intervals as noted), the liquid (pad) extract remaining in the bag after microbial testing was pH tested (if volume was sufficient).

By way of example, Table 1 lists various absorbent pads made according to the present invention that were tested per the above-protocol.

TABLE 1

Test Conditions

| Condition | Tested | Nominal Pad Abs. | Active Components | | |
|---|---|---|---|---|---|
| | | | Oxygen Scavenger | $CO_2$ Generator | Bacterial Inhibitor |
| 25 | Purge | 75 | | | X |
| 49 | Meat | 75 | X | | X |
| 49A | Meat | 75 | X | | X |
| 50 | Meat | 75 | X | | X |
| 50A | Meat | 75 | X | | X |
| 57 | Purge | 75 | X | X | X |
| 58 | Purge | 75 | X | | X |
| 55 | Meat | 75 | X | X | X |
| 56 | Meat | 75 | X | X | X |
| 59 | Meat | 75 | X | | X |
| 61 | Purge | 75 | X | | X |
| 63 | Purge | 75 | | X | X |
| 80 | Meat | 75 | X | X | X |
| 80 | Purge | 75 | X | X | X |
| 91 | Purge | 75 | X | X | X |
| 92 | Meat | 50 | | X | |
| 93 | Meat | 50 | | X | |
| 94 | Meat | 50 | | X | X |

The test results for the above-referenced conditions are set forth in FIGS. 14 through 22. Referring to these Figures, it is evident that the absorbent food pads according to the various embodiments of the present invention result in a significant reduction in CFU's when compared to the controls. As a result of this reduction, food preservation and/or safety are increased.

Additional testing was done that evaluates different absorbent pad architectures according to the present invention and compares their ability to reduce the $O_2$ concentration and $CO_2$ generation in a tray with 400 ml head space. Table 2 below sets for the different absorbent pad architectures tested.

TABLE 2

Pad Architecture Test Conditions

| Condition | Tested | Nominal Pad Abs. | Active Components | | |
|---|---|---|---|---|---|
| | | | Oxygen Scavenger | $CO_2$ Generator | Bacterial Inhibitor |
| Poly Double Layer (DL) | Gas | 50 | X | | |
| Rubber Netting | Gas | 50 | X | | |
| Netting RB404 | Gas | 50 | X | | |
| R03018 Spacer | Gas | 50 | X | | |
| FNB216 Spacer | Gas | 50 | X | | |
| Poly DL-Atmospheric | Gas | 50 | X | | |
| Pad -no netting | Gas | 50 | X | | |

Figure 23:
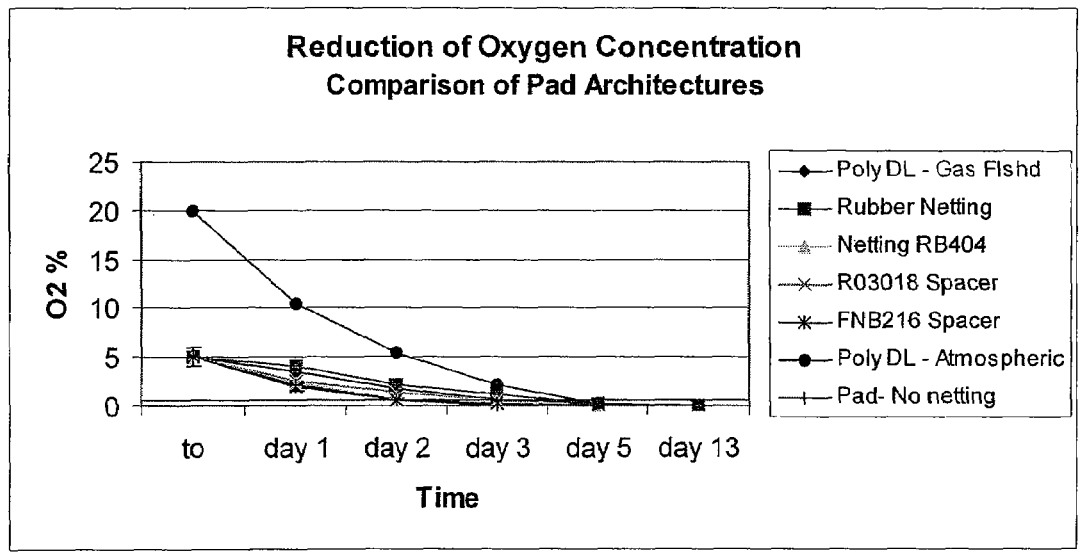
FIG. 23 is a graph depicting the reduction of oxygen concentration over a period of time for seven absorbent pads according to other embodiments of the present invention.
Figure 24:
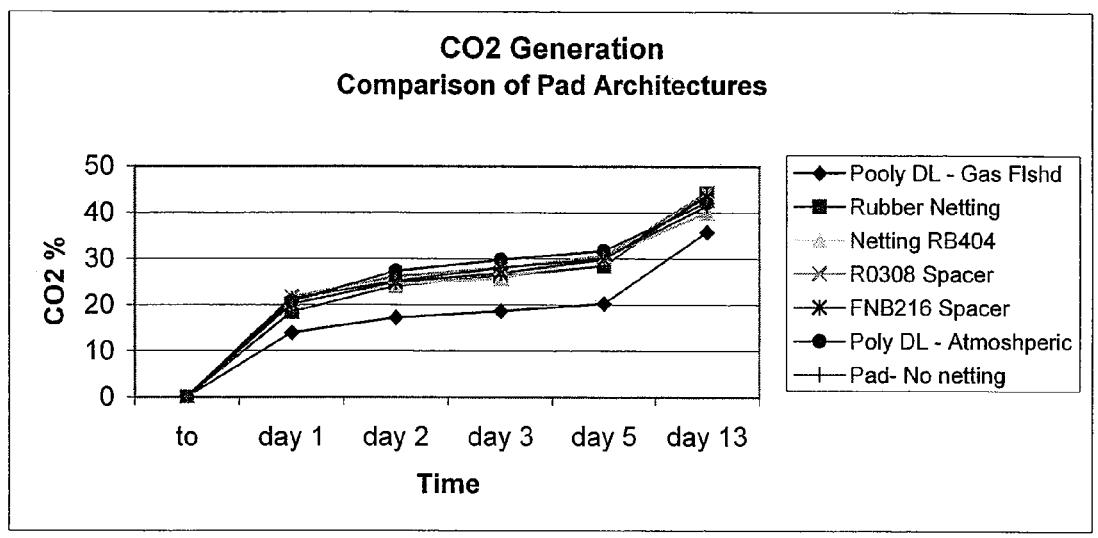
FIG. 24 is a graph depicting the $CO_2$ generation over a period of time for the seven absorbent pads noted in FIG. 23.

All but one of the test conditions, namely Poly DL-atmospheric, were carried out gas flushing the trays with $N_2$ to a starting gas composition of 5% Oxygen. Referring to FIG. 23, the graph shows that an absorbent pad according to the present invention can reduce the oxygen concentration to less than 0.5% within 48 hours from an initial 5% and that the system is strong enough to reduce the concentration in the tray from atmospheric conditions (about 20% $O_2$) and maintain the low oxygen conditions. Referring to FIG. 24, the graph shows that an absorbent pad according to the present invention can also generate significant $CO_2$.

In addition to the above testing examples, the effects of absorbent pads of the present invention were evaluated on the quality of chicken breasts over time using subjective methods.

Materials and Methods

The effect of absorbent pads according to the present invention on boneless, skinless chicken breasts was evaluated using untrained consumer panels with 30 panelists over a 14-day period. For each panel, participants received 2 samples to rate: a boneless, skinless breast in traditional overwrap with an untreated absorbent pad and a boneless, skinless breast with both an absorbent pad of the present invention and a gas-flushed package.

Samples were marked with random numbers and presented in random order to panelists. Attributes tested included overall appearance, color, slime formation, aroma, and overall acceptability. All attributes were measured on a 9-point scale. Overall appearance, color, aroma, and overall acceptability were rated using a hedonic anchors and slime formation was rated on a line scale with the anchors of "No Slime" and "Extreme Slime."

Ratings were averaged for each attribute and an analysis of variance (ANOVA) was performed on the data to show differences in treatment means at the alpha=0.05 level. Panels were be conducted on days 0, 3, 5, 7, 10, 12, and 14 and during this time product was stored at 38-40° F.

Table 3 shows differences in treatment means for each attribute over time.

TABLE 3

| Date | Appearance AVERAGE | | Color AVERAGE | | Aroma AVERAGE | | Slime AVERAGE | | Overall AVERAGE | |
|---|---|---|---|---|---|---|---|---|---|---|
| | Control | Treated | Control | Treated | Control | Treated | Control | Treated | Control | Treated |
| Jul. 22, 2005 | 7.0 | 6.4 | 7.2 | 6.5 | 6.8 | 6.7 | 2.4 | 2.3 | 7.0 | 6.7 |
| Jul. 25, 2005 | 6.7 | 6.9 | 6.1 | 6.8 | 5.9 | 6.6 | 2.9 | 3.0 | 6.3 | 6.9 |

TABLE 3-continued

| Date | Appearance AVERAGE | | Color AVERAGE | | Aroma AVERAGE | | Slime AVERAGE | | Overall AVERAGE | |
|---|---|---|---|---|---|---|---|---|---|---|
| | Control | Treated | Control | Treated | Control | Treated | Control | Treated | Control | Treated |
| Jul. 27, 2005 | 5.1 | 6.6 | 4.7 | 6.6 | 4.7 | 5.9 | 3.7 | 3.4 | 4.8 | 6.4 |
| Jul. 29, 2005 | 4.6 | 6.0 | 3.8 | 6.0 | 5.5 | 5.8 | 4.7 | 3.6 | 5.1 | 5.8 |
| Aug. 1, 2005 | 5.5 | 6.5 | 5.0 | 6.4 | 5.2 | 5.7 | 3.7 | 3.5 | 5.2 | 6.1 |
| Aug. 3, 2005 | 3.7 | 5.2 | 3.3 | 5.3 | 3.0 | 5.5 | 3.5 | 3.9 | 3.1 | 5.1 |
| Aug. 5, 2005 | 3.0 | 4.5 | 3.2 | 5.5 | 3.1 | 5.1 | 3.5 | 3.7 | 3.1 | 5.2 |

Figure 25:
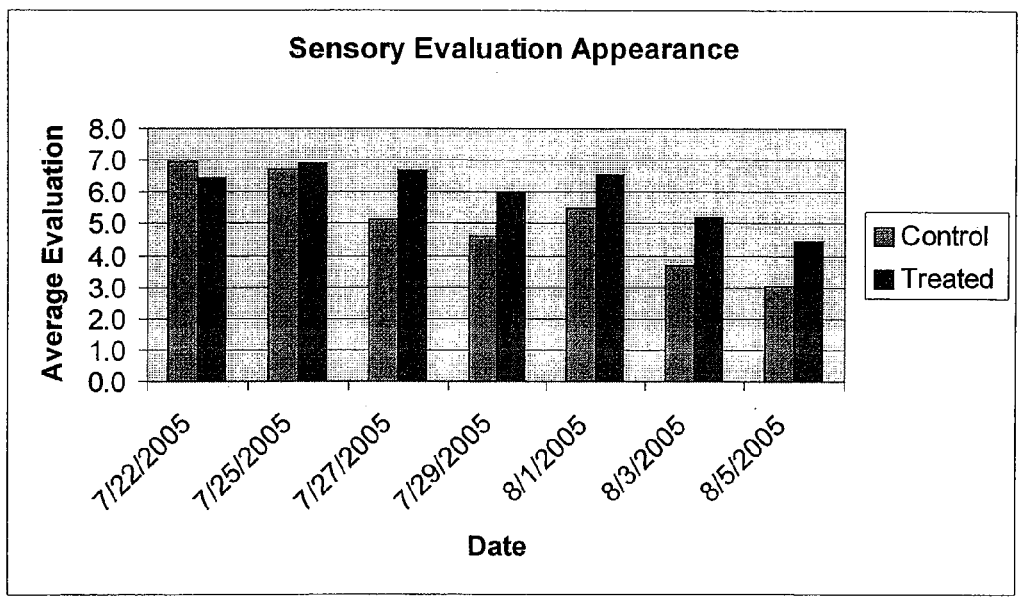
FIG. 25 is a graph depicting the sensory evaluation for appearance of a control sample and a treated sample using an absorbent pad according to the present invention.

For the above-tested attributes, changes were seen as follows:

Appearance: As depicted in FIG. 25, significant differences were seen between the control and treated samples for sampling points at days 5, 7, 10, 12, and 14. The associated p-values were 0.0007, 0.007, 0.012, 0.001, and 0.004, respectively. Panelists consistently rated the treated chicken breast higher on the hedonic scale for appearance on each of these days, indicating that the untrained consumer preferred the treated chicken breast's appearance over that of the control sample.

Figure 26:
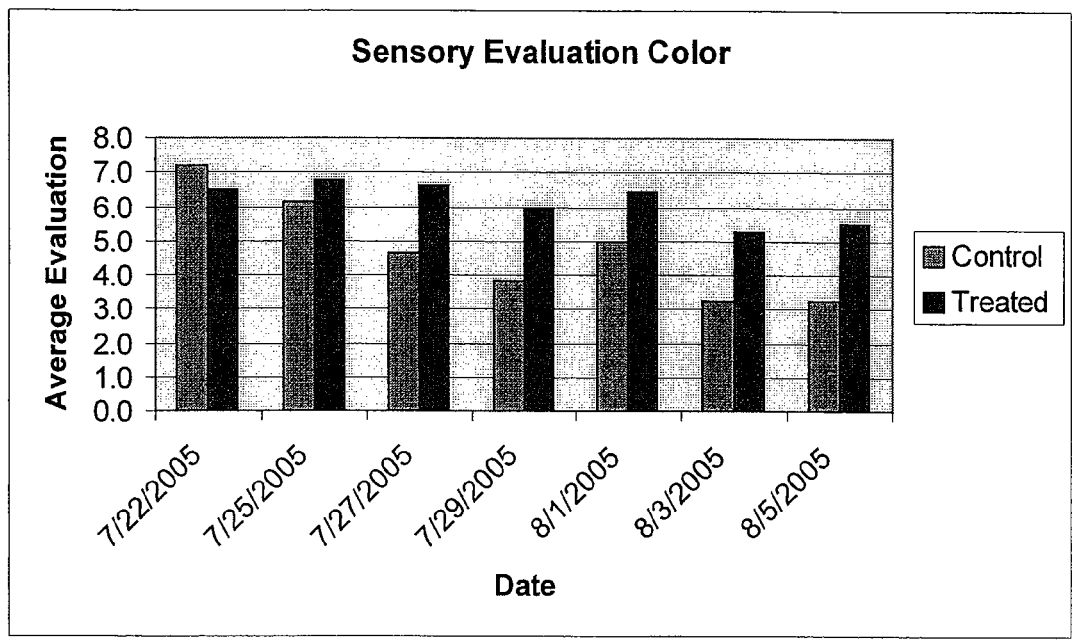
FIG. 26 is a graph depicting the sensory evaluation for color of a control sample and a treated sample using an absorbent pad according to the present invention.

Color: As depicted in FIG. 26, significant differences were seen between the control and treated samples for sampling points at days 5, 7, 10, 12, and 14. The associated p-values were 0.0001, 0.000007, 0.0006, 0.00003, and 0.00001, respectively. Panelists consistently rated the treated chicken breast higher on the hedonic scale for color on each of these days, indicating that the untrained consumer preferred the treated chicken breast's color over that of the control sample.

Figure 27:
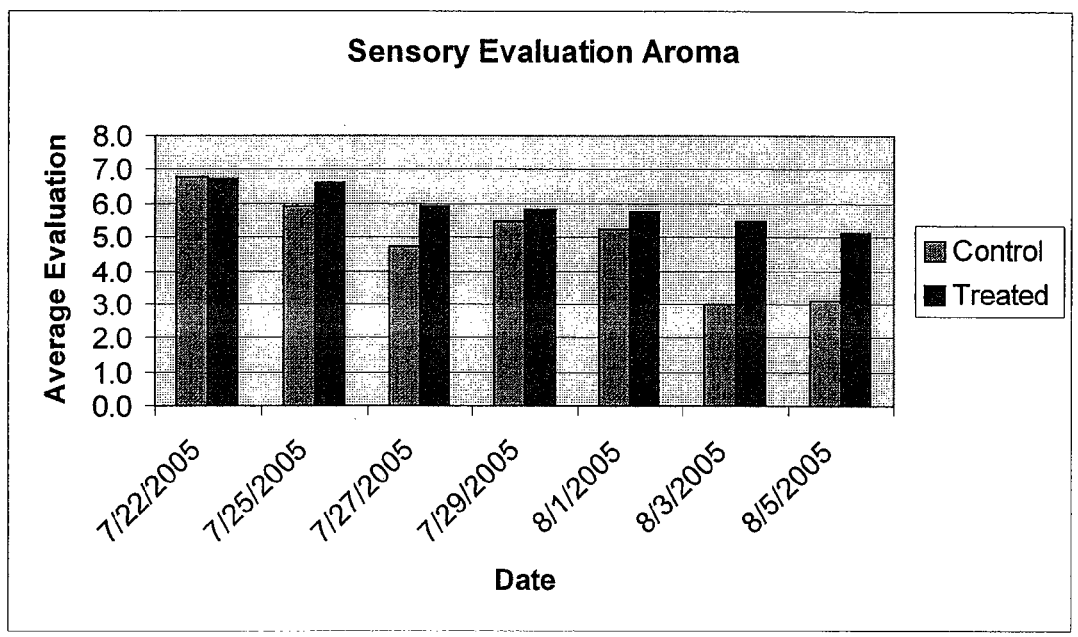
FIG. 27 is a graph depicting the sensory evaluation for aroma of a control sample and a treated sample using an absorbent pad according to the present invention.
Figure 28:
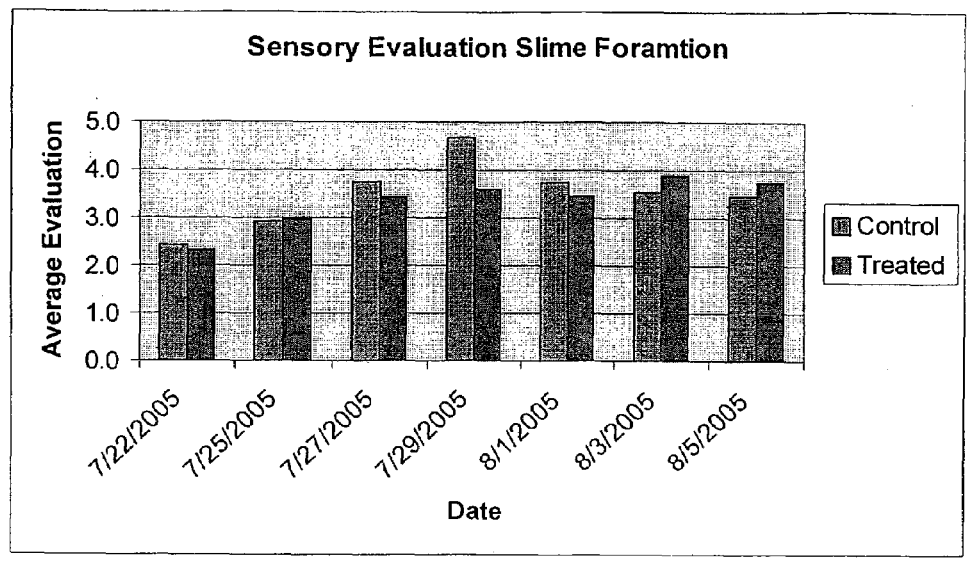
FIG. 28 is a graph depicting the sensory evaluation for slime formation of a control sample and a treated sample using an absorbent pad according to the present invention

Aroma: As depicted in FIG. 27, significant differences were seen between the control and treated samples for sampling points at days 5, 12, and 14. The associated p-values were 0.008, 0.000001, 0.00003, respectively. Panelists consistently rated the treated chicken breast higher on the hedonic scale for aroma on each of these days, indicating that the untrained consumer preferred the treated chicken breast's aroma over that of the control sample.

Slime: Slime Formation showed no significant differences over time when panelists compared the control and treated samples.

Figure 29:
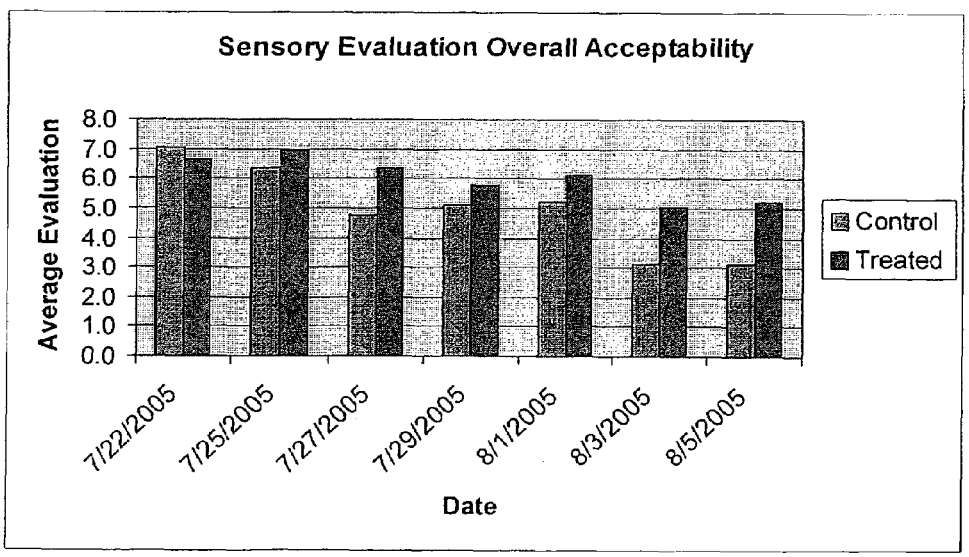
FIG. 29 is a graph depicting the sensory evaluation for overall acceptability of a control sample and a treated sample using an absorbent pad according to the present invention.

Overall Acceptability: As depicted in FIG. 29, significant differences were seen between the control and treated samples for sampling points at days 5, 12, and 14. The associated p-values were 0.0002, 0.015, 0.00003, and 0.0000001, respectively. Panelists consistently rated the treated chicken breast higher on the hedonic scale for overall acceptability on each of these days, indicating that the untrained consumer preferred the treated chicken breast over that of the control sample.

Overall, the use of the antimicrobial pad according to the present invention and the gas flush had significant effects on the quality of boneless, skinless chicken breasts in the attributes of appearance, color, aroma, and overall acceptability. It can be concluded that the use of the antimicrobial pad according to the present invention and the gas flush did extend the period of time that the product was found to be acceptable for consumers, especially during day 10-14, where the control sample became unacceptable to consumers.

The present invention has been described with particular reference to the preferred embodiments. It will be obvious to one of ordinary skill in the art that changes and modifications may be made to the above description without departing from the spirit and scope of the invention, as set forth in the appended claims.

We claim:

1. A multi-phase bacterial inhibition food pad comprising:
   an absorbent or superabsorbent medium;
   one or more organic acid bacterial inhibitor present in said absorbent or superabsorbent medium in an amount of about 1 wt % to about 3 wt % based on a nominal absorbency of the food pad, wherein the one or more organic acid bacterial inhibitor inhibits growth of bacteria in a liquid purge from a meat in the food pad; and
   an $O_2$ scavenging system, wherein the $O_2$ scavenging system comprises one or more metal oxidation components, one or more enzyme catalyzed oxidation components present in said absorbent or superabsorbent medium in the food pad in an amount between about 1 wt % to about 10 wt % based on a nominal absorbency of the food pad, or any combinations thereof.

2. The multi-phase bacterial inhibition food pad of claim 1, wherein said one or more metal oxidation components include a combination of at least one oxidizable metal and at least one catalyst, and wherein the at least one oxidizable metal is selected from the group consisting of iron, zinc, copper, aluminum, tin, and any combinations thereof, wherein the at least one catalyst is selected from the group consisting of acid, water, and any combinations thereof.

3. The multi-phase bacterial inhibition food pad of claim 1, wherein said $O_2$ scavenging system comprises one or more enzyme catalyzed oxidation components selected from the group consisting of oxidoreductase, invertase, amylase, maltase, catalase, dehydrogenase, oxidase, glucose oxidase, hexose oxidase, oxygenase, peroxidase, cellulose, and any combinations thereof.

4. The multi-phase bacterial inhibition food pad according to claim 1, further comprising:
   a $CO_2$ generation system in an amount of about 0.5 wt % to about 10 wt % based on a nominal absorbency of the food pad.

* * * * *